(12) United States Patent
Ohashi et al.

(10) Patent No.: US 7,514,507 B2
(45) Date of Patent: Apr. 7, 2009

(54) COMB-SHAPED EPOXY RESIN AND METHOD FOR PREPARING COMB-SHAPED EPOXY RESIN

(75) Inventors: Yuji Ohashi, Sakura (JP); Ren-Hua Jin, Tokyo (JP); Seungtaeg Lee, Sakura (JP)

(73) Assignees: Dainippon Ink and Chemicals, Inc., Tokyo (JP); Kawamura Institute of Chemical Research, Sakura-shi (JP)

( * ) Notice: Subject to any disclaimer, the term of this patent is extended or adjusted under 35 U.S.C. 154(b) by 380 days.

(21) Appl. No.: 10/593,244

(22) PCT Filed: Mar. 23, 2005

(86) PCT No.: PCT/JP2005/005255

§ 371 (c)(1),
(2), (4) Date: Sep. 18, 2006

(87) PCT Pub. No.: WO2005/092944

PCT Pub. Date: Oct. 6, 2005

(65) Prior Publication Data

US 2007/0142611 A1    Jun. 21, 2007

(30) Foreign Application Priority Data

Mar. 25, 2004    (JP) .............................. 2004-089045

(51) Int. Cl.
*C08G 59/14*    (2006.01)
(52) U.S. Cl. ...................... 525/523; 525/524; 525/529; 528/109; 528/110; 528/119
(58) Field of Classification Search .................. None
See application file for complete search history.

(56) References Cited

U.S. PATENT DOCUMENTS 4,829,105 A * 5/1989 Yamada et al. .............. 523/415

FOREIGN PATENT DOCUMENTS

| EP | 0 186 523 A2 | 7/1986 |
| EP | 0 758 662 A2 | 2/1997 |
| JP | 61-191700 | 8/1986 |
| JP | 5-70558 | 3/1993 |
| JP | 9-104740 | 4/1997 |

* cited by examiner

*Primary Examiner*—Robert Sellers
(74) *Attorney, Agent, or Firm*—Edwards Angell Palmer & Dodge LLP

(57) ABSTRACT

The present invention provides a comb-shaped epoxy resin represented by the following formula (1):

[Chemical formula 1]

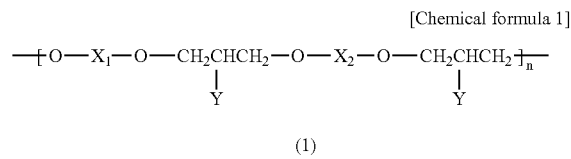

(1)

in the formula (1), $X_1$ and $X_2$ represent a divalent group having a residue selected from xanthene residue, biphenylene residue, hydrogenated bisphenol residue, alkylene residue and polyoxyalkylene residue, each may having a methyl group or a ethyl group as a substituent, and at least one of them is an aromatic residue, Y represents a polymer chain such as linear polymer chain, a number average polymerization degree being 5 to 2000, and n (number average polymerization degree) represents an integer within a range of 3 to 200, and to a method for preparing the comb-shaped epoxy resin.

13 Claims, No Drawings

COMB-SHAPED EPOXY RESIN AND METHOD FOR PREPARING COMB-SHAPED EPOXY RESIN

TECHNICAL FIELD

The present invention relate to a comb-shaped epoxy resin comprising a main chain composed of an epoxy resin skeleton, and a polymer chain composed of any one of an ethyleneimine structural unit and an N-acylethyleneimine unit, as a side chain, and to a method for preparing the same.

BACKGROUND ART

An epoxy resin forms a three-dimensional crosslinked structure by the reaction between an epoxy group in the epoxy resin and a curing agent, and is applied for various purposes such as electrical and adhesion purposes, including coating materials, because of its excellent physical, chemical and electrical properties. The epoxy resin typified by a bisphenol A type epoxy resin has a secondary alcohol structure composed of epihalohydrin and an aromatic dihydroxy compound, or a diglycidyl compound and an aromatic dihydroxy compound in a main chain, and is excellent in hydrophobicity excluding a side chain hydroxy group in the secondary alcohol structure. The side chain hydroxy group in the secondary alcohol structure has hydrophilicity but is not necessarily excellent in hydrophilicity. Therefore, the epoxy resin does not form a stable polymer micelle in water and hardly exhibits a function such as encapsulization peculiar to the polymer micelle.

For example, the epoxy resin can be water-solublized by neutralizing a semiesterified modified epoxy resin, which is obtained by reacting a hydroxy group in a side chain with an acid anhydride, with a base (see, for example, Japanese Unexamined Patent Application, First Publication No. Hei 5-70558), or neutralizing a tertiary amino group-modified epoxy resin, which is obtained by reacting a glycidyl group in an epoxy resin with a secondary amine, with an acid. However, these water-solubilized epoxy resin also do not form a stable polymer micelle in water and hardly exhibit a function such as encapsulization peculiar to the polymer micelle.

DISCLOSURE OF THE INVENTION

An object to be achieved by the resent invention is to provide a novel comb-shaped epoxy resin comprising a hydrophobic main chain and a hydrophilic side chain, particularly a comb-shaped epoxy resin polymer having micelle formation ability, and to provide a simple method for preparing the comb-shaped epoxy resin.

The present inventors have found that a comb-shaped epoxy resin comprising a main chain composed of an epoxy resin skeleton having a propylene unit and a polymer chain composed at least one of an ethyleneimine structural unit and an N-acylethyleneimine unit as a side chain forms a polymer micelle in water and also a comb-shaped epoxy resin comprising an epoxy resin having a propylene unit as a main chain and a linear cationic polymer such as polyoxazoline as a side chain can be prepared by cationic polymerization of a cationic polymerizable monomer such as oxazoline using, as a cationic polymerization initiator, a modified epoxy resin wherein a side chain hydroxy group of a secondary alcohol structure moiety in an epoxy resin having a secondary alcohol structure is substituted with a group having high leaving ability such as alkylsulfonyloxy group or arylsulfonyloxy group. Thus, the present invention has been completed.

That is, the present invention provides a comb-shaped epoxy resin represented by the following formula (1):

[Chemical formula 1]

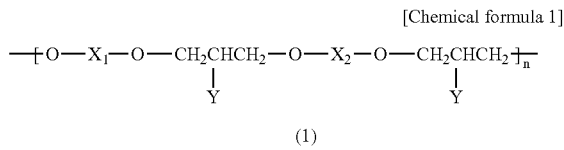

(1)

in the formula (1), $X_1$ and $X_2$ may be the same or different and represents a divalent group having a residue selected from a xanthene residue which may have a methyl group or an ethyl group as a substituent, a biphenylene residue which may have a methyl group or an ethyl group as a substituent, a bisphenol residue which may have a methyl group or an ethyl group or a halogen atom as a substituent, a hydrogenated bisphenol residue which may have a methyl group as a substituent, an alkylene residue and a polyoxyalkylene residue, and at least one of them is an aromatic residue and may vary with a repeating unit; Y represents a linear polymer chain composed of at least one of an ethyleneimine structural unit and an N-acylethyleneimine unit, or a polymer chain composed of a polyethyleneimine-polyalkylene ether block unit or a poly N-acylethyleneimine-polyalkylene ether block unit, a number average polymerization degree being within a range from 5 to 2000, and n (number average polymerization degree) represents an integer of 3 to 200.

Also the present invention provides a method for preparing a comb-shaped epoxy resin comprising a main chain composed of an epoxy resin skeleton, and a linear polymer chain obtained by polymerizing a cationic polymerizable monomer as a side chain, which comprises the steps of using, as a cation polymerization initiator, a modified epoxy resin wherein a hydroxy group of a side chain of a secondary alcohol structure moiety in an epoxy resin having a secondary alcohol structure is substituted with an alkylsulfonyloxy group or an arylsulfonyloxy group, and cation-polymerizing a monomer capable of being polymerized by cation polymerization.

EFFECTS OF THE INVENTION

The comb-shaped epoxy resin of the present invention has an epoxy resin skeleton having a propylene unit as a main chain, and a linear polymer chain composed of an ethyleneimine structural unit, an N-acylethyleneimine structural unit, a polyethyleneimine-polyalkylene ether block unit or a poly N-acylethyleneimine-polyalkylene ether block unit as a side chain and therefore has both a hydrophobic moiety and a hydrophilic moiety in the molecule and can control each structure, and thus the comb-shaped epoxy resin can easily form a polymer micelle in water. Consequently, the polymer micelle thus obtained has a characteristic function which enables encapsulization, and can be applied for various purposes including medicines and pesticides, cosmetics, perfumes, toners, liquid crystals, inks, coating materials and plastics.

The comb-shaped epoxy resin can be prepared by a simple method of using, as a cationic polymerization initiator, a modified epoxy resin wherein a side chain hydroxy group of the secondary alcohol structure moiety in an epoxy resin having a secondary alcohol structure is substituted with a group having high leaving ability such as alkylsulfonyloxy group or arylsulfonyloxy group, and cationic polymerizing a cationic polymerizable monomer such as oxazoline.

BEST MODE FOR CARRYING OUT THE INVENTION

The comb-shaped epoxy resin represented by the above formula of the present invention comprises an epoxy resin skeleton having a number average polymerization degree of 3 to 200 composed of a propylene unit, as a main chain, and a linear polymer chain having a number average polymerization degree of 5 to 2000, which is linked to tertiary carbon of the propylene unit and is composed of at least one of an ethyleneimine structural unit, an N-acylethyleneimine structural unit, a polyethyleneimine-polyalkylene ether block unit and a poly N-acylethyleneimine-polyalkylene ether block unit, as a side chain. As used herein, the propylene unit refers to a structural unit represented by the following formula (i):

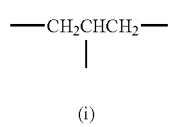

[Chemical formula 2]

(i)

which is present in the epoxy resin skeleton.

The main chain of the comb-shaped epoxy resin is derived from a conventionally known epoxy resin having a secondary alcohol structure in the structure, such as epoxy resin obtained from epihalohydrin and an aromatic dihydroxy compound or an epoxy resin obtained from a diglycidyl compound and an aromatic dihydroxy compound, and the number of a side chain hydroxy group in the secondary alcohol structure is preferably 6 or more, and preferably within a range from 6 to 400, so as to exhibit properties peculiar to the comb-shaped structure.

The epoxy resin, which forms a main chain skeleton of the comb-shaped epoxy resin, is a conventionally known epoxy resin having a secondary alcohol structure in the structure such as epoxy resin obtained from epihalohydrin and an aromatic dihydroxy compound, or epoxy resin obtained from a diglycidyl compound and an aromatic dihydroxy compound.

Examples of the aromatic dihydroxy compound include those having at least one benzene ring, a hydroxy group being directly linked to the ring, such as dihydroxybenzene, diphenol, bisphenol and xanthene; those having at least one benzene ring, a hydroxy group being directly linked to the ring, such as dihydroxynaphthalene; and those having at least one anthracene ring, a hydroxy group being directly linked to the ring, such as dihydroxyanthracene.

The diglycidyl compound has two glycidyl groups in the molecule and examples thereof include aromatic diglycidyl compound, aliphatic diglycidyl compound, alicyclic diglycidyl compound and heterocyclic diglycidyl compound.

The xanthene residue which may have a methyl group as a substituent, selected as $X_1$ in the comb-shaped epoxy resin represented by the above formula (1) of the present invention, includes, for example, a divalent group derived from an aromatic dihydroxy compound having a xanthene skeleton described hereinafter, and is particularly preferably a divalent group having a xanthene skeleton represented by the following formula (2):

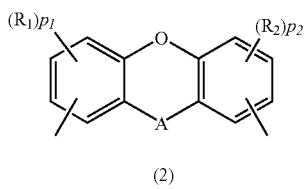

[Chemical formula 3]

(2)

or the following formula (3):

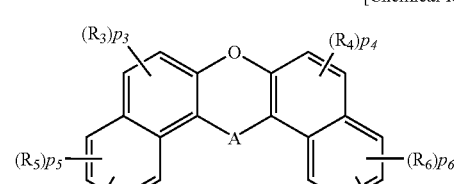

[Chemical formula 4]

(3)

in the formula (2) and the formula (3), A represents a carbon atom, a methylene group, a methylene group substituted with an alkyl group having 1 to 4 carbon atoms, a methylene group substituted with a phenyl group, a methylene group substituted with a naphthyl group, a bimethylene group substituted with a phenyl group, a methylene group substituted with a 9-fluorenyl group, or a methylene group in which an alkyl group is further aromatic nucleus-substituted on the phenyl group, the naphthyl group or the biphenyl group, $R_1$ to $R_6$ represent a methyl group, $p_1$, $p_2$, $p_5$, $p_6$ each independently represents an integer of 0 to 3, and $p_3$ and $p_4$ each independently represents an integer of 0 to 2, because of its excellent heat resistance and solubility.

The biphenylene residue which may have a methyl group as a substituent, selected as $X_1$ in the above formula (1), includes, for example, a divalent group derived from an aromatic dihydroxy compound having a biphenylene skeleton described hereinafter, and is particularly preferably a divalent group having a biphenylene skeleton represented by the following formula (4):

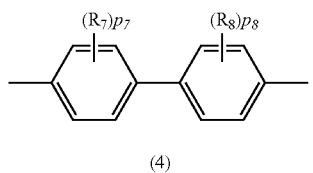

[Chemical formula 5]

(4)

in the formula (4), $R_7$ and $R_8$ represent a methyl group, and $p_7$ and $p_8$ each independently represents an integer of 0 to 4, because of its excellent heat resistance.

The bisphenol residue which may have a methyl group or halogen atom as a substituent, selected as $X_1$ in the above formula (1), includes, for example, a divalent group derived from an aromatic dihydroxy compound having a diphenylalkane skeleton or a diphenylsulfone skeleton described hereinafter, and is particularly preferably a divalent group having a bisphenol skeleton represented by the following formula (5):

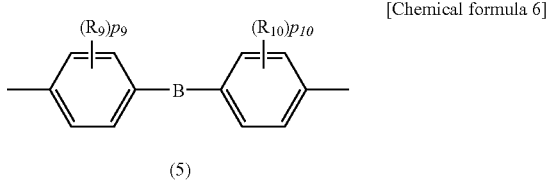

(5)

in the formula (5), B represents —C(CH$_3$)$_2$—, —CH(CH$_3$)—, —CH$_2$—, —C(CH$_3$)(CH$_2$CH$_3$)—, —C(CH$_3$)(C$_6$H$_5$)— or —SO$_2$—, R$_9$ and R$_{10}$ represent a methyl group or a halogen atom, and p$_9$ and p$_{10}$ each independently represents an integer of 0 to 4, because of its excellent solubility.

The xanthene residue which may have a methyl group as a substituent, selected as X$_2$ in the comb-shaped epoxy resin of the present invention represented by the above formula (1), includes, for example, a divalent group derived from an aromatic dihydroxy compound having a xanthene skeleton or an aromatic diglycidyl compound having a xanthene skeleton described hereinafter, and is particularly preferably a divalent group represented by the above formula (2) or (3), because of its excellent heat resistance and solubility.

The biphenylene residue which may have a methyl group as a substituent, selected as X$_2$ in the above formula (1), includes, for example, a divalent group derived from an aromatic dihydroxy compound having a biphenylene skeleton or an aromatic diglycidyl compound having a biphenylene skeleton described hereinafter, and is particularly preferably a divalent group represented by the above formula (4), because of its excellent heat resistance.

The bisphenol residue which may have a methyl group or a halogen atom as a substituent, selected as X$_2$ in the above formula (1), includes, for example, a divalent group derived from an aromatic dihydroxy compound having a diphenylalkane skeleton or a diphenylsulfone skeleton or an aromatic diglycidyl compound having a diphenylalkane skeleton or a diphenylsulfone skeleton described hereinafter, and is particularly preferably a divalent group represented by the above formula (5), because of excellent solubility.

The hydrogenated bisphenol residue selected as X$_2$ in the above formula (1) includes, for example, a divalent group derived from an aliphatic diglycidyl compound having a dicyclohexylalkane skeleton described hereinafter, and is particularly preferably a divalent group represented by the following formula (6):

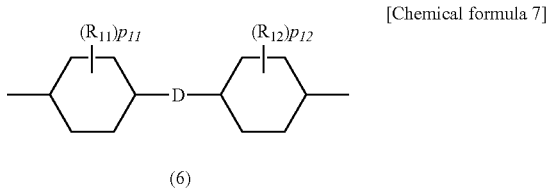

(6)

in the formula (6), D represents —C(CH$_3$)$_2$—, —CH(CH$_3$)—, —CH$_2$—, —C(CH$_3$)(CH$_2$CH$_3$)— or —C(CH$_3$)(C$_6$H$_5$)—, R$_{11}$ and R$_{12}$ represent a methyl group, and p$_{11}$ and p$_{12}$ each independently represents an integer of 0 to 4, because of its excellent solubility and weatherability.

The alkylene residue or polyoxyalkylene residue selected as X$_2$ in the above formula (1) includes, for example, a divalent group derived from a diglycidyl compound having an alkylene skeleton or a polyoxyalkylene skeleton described hereinafter, and is particularly preferably a divalent group represented by the following formula (7):

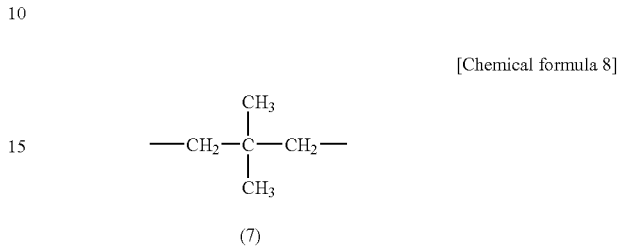

(7)

the following formula (8):

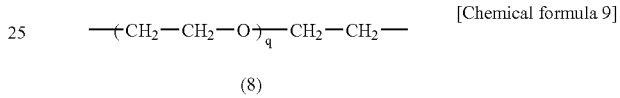

(8)

in the formula (8), q represents an integer of 0 to 100, or the following formula (9):

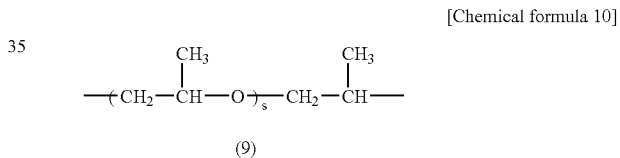

(9)

in the formula (9), s represents an integer of 0 to 100, because of its excellent flexibility.

Both X$_1$ and X$_2$ described above may vary with a repeating unit and at least one is an aromatic residue. X$_1$ and X$_2$ may be the same or different and the number of the structure selected in a molecule is not limited in case of both X$_1$ and X$_2$. If about two kinds of structures are present for each substituent, properties suited for the objective purposes can be imparted to the comb-shaped polymer. Those having a divalent group having a biphenylene residue and a xanthene residue or a biphenol residue are preferable because rigidity and solubility can be imparted to the main chain. The biphenol residue is preferable because rigidity and solubility can be imparted to the main chain, and an aromatic dihydroxy compound having a diphenylalkane skeleton or a diphenylsulfone skeleton or an aromatic diglycidyl compound having a diphenylalkane skeleton or a diphenylsulfone skeleton as a raw material is easily available.

When the epoxy resin which forms a main chain skeleton of the comb-shaped epoxy resin represented by the above formula (1) is obtained from epihalohydrin and an aromatic dihydroxy compound, the terminal structure is a structure derived from epihalohydrin or an aromatic dihydroxy compound. When the epoxy resin is obtained from a diglycidyl compound and an aromatic dihydroxy compound, the terminal structure is a structure derived from a diglycidyl compound or an aromatic dihydroxy compound. As described above, since the terminal structure of the main chain skeleton of the comb-shaped epoxy resin represented by the above formula (1) can have these various structures, the total number of $X_1$ and $X_2$ in a molecule is not necessarily even number.

The polymerization degree of the linear polymer chain composed of at least one of an ethyleneimine structural unit and an N-acylethyleneimine structural unit constituting the side chain of the comb-shaped epoxy resin represented by the above formula (1) is preferably within a range from 5 to 2000, and particularly preferably from 5 to 200, because the polymerization degree is easily controlled.

Examples of the linear polymer chain composed at least one of an N-acylethyleneimine structural unit and an ethyleneimine structural unit include a linear polymer chain composed only of an N-acylethyleneimine structural unit, a linear polymer chain composed only of an ethyleneimine structural unit, and a linear polymer chain composed of a combination of an N-acylethyleneimine structural unit and an ethyleneimine structural unit. It is also possible to use a linear polymer chain wherein a structural unit having a different acyl group is used as an N-acylethyleneimine structural unit. The linear polymer chain composed only of an ethyleneimine structural unit includes a branched polymer chain obtained by cationic polymerization of ethyleneimine and a linear polymer chain obtained by hydrolyzing an acyl group of a linear polymer chain composed of an N-acylethyleneimine structural unit. The polymer chain, which forms a side chain structure of the comb-shaped epoxy resin of the present invention, is a linear polymer chain obtained by hydrolyzing an acyl group of a linear polymer chain composed of an N-acylethyleneimine structural unit, which exhibits properties peculiar to a comb-shaped structure. The polymer chain composed only of an ethyleneimine structural unit has high hydrophilicity, and a salt such as hydrochloride has higher water solubility.

The polymer chain is generally polyoxazoline obtained by cationic polymerization of an oxazoline monomer, and examples thereof include polyethyleneimine acylated by an aliphatic saturated carboxylic acid, such as poly(N-formylethyleneimine), poly(N-acetylethyleneimine), poly(N-propionylethyleneimine), poly(N-butyrylethyleneimine), poly(N-isobutyrylethyleneimine), poly(N-pivaloylethyleneimine), poly(N-lauroylethyleneimine), poly(N-stearoylethyleneimine) or poly(N-(3-(perfluorooctyl)propionyl)ethyleneimine); ethyleneimine acylated by an aliphatic unsaturated carboxylic acid, such as poly(N-acryloylethyleneimine), poly(N-methacryloylethyleneimine) or poly(N-oleoylethyneimine); and polyethyleneimine acylated by an aromatic carboxylic acid, such as poly(N-benzoylethyleneimine), poly(N-toluyloylethyleneimine), poly(N-naphthoylethyleneimine) or poly(N-cinnamoylethyleneimine).

The comb-shaped epoxy resin of the present invention, which can preferably form a polymer micelle, is an epoxy resin comprising a main chain composed of an epoxy resin skeleton and a linear polymer chain composed at least one of an ethyleneimine structural unit and an N-acylethyleneimine unit as a side chain, which is represented by the following formula (1).

The linear polymer chain composed of at least one of an ethyleneimine structural unit and an N-acylethyleneimine unit represented by Y in the above formula (1) is preferably at least one selected from linear polymer chains represented by the following formula (10):

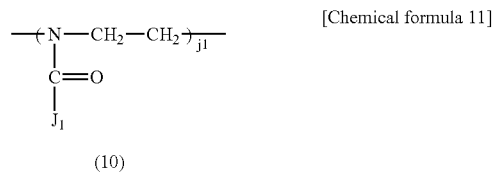

[Chemical formula 11]

(10)

in the formula (10), $J_1$ represents a hydrogen atom, an alkyl group having 1 to 18 carbon atoms or an aryl group having 6 to 36 carbon atoms, and $j_1$ is within a range from 5 to 2,000, and preferably from 5 to 200, the following formula (11):

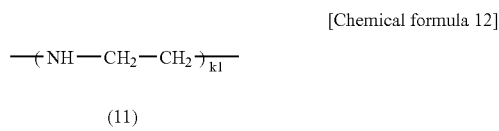

[Chemical formula 12]

(11)

in the formula (11), $k_1$ is within a range from 5 to 2,000, and preferably from 5 to 200, the following formula (12)

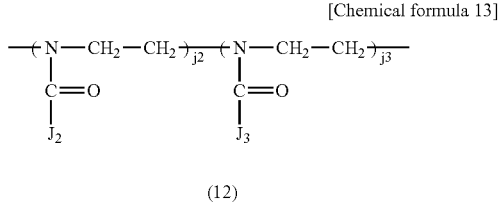

[Chemical formula 13]

(12)

in the formula (12), $J_2$ and $J_3$ represent a hydrogen atom, an alkyl group having 1 to 18 carbon atoms or an aryl group having 6 to 36 carbon atoms, each being different, and $j_2+j_3$ is within a range from 5 to 2,000, and preferably from 5 to 200, the following formula (13)

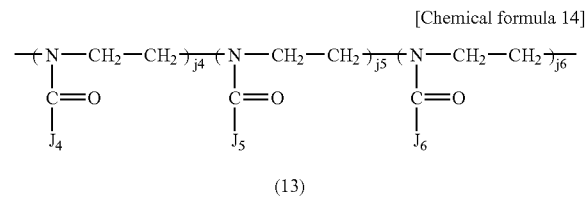

[Chemical formula 14]

(13)

in the formula (13), $J_4$ to $J_6$ represent a hydrogen atom, an alkyl group having 1 to 18 carbon atoms or an aryl group having 6 to 36 carbon atoms, each being different, and $j_4+j_5+j_6$ is within a range from 5 to 2,000, and preferably from 5 to 200, the following formula (14)

[Chemical formula 15]

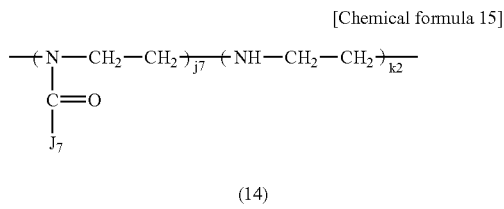

(14)

in the formula (14), $J_7$ represents a hydrogen atom, an alkyl group having 1 to 18 carbon atoms or an aryl group having 6 to 36 carbon atoms, and $j_7+k_2$ is within a range from 5 to 2,000, and preferably from 5 to 200, the following formula (15)

[Chemical formula 16]

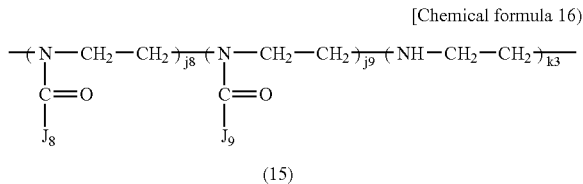

(15)

in the formula (15), $J_8$ and $J_9$ represent a hydrogen atom, an alkyl group having 1 to 18 carbon atoms or an aryl group having 6 to 36 carbon atoms, each being different, and $j_8+j_9+k_2$ is within a range from 5 to 2,000, and preferably from 5 to 200, the following formula (16)

[Chemical formula 17]

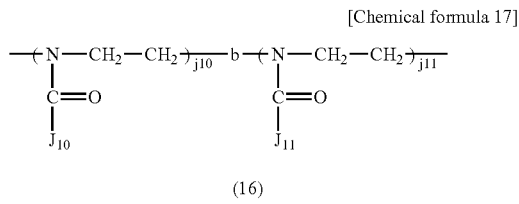

(16)

in the formula (16), $J_{10}$ and $J_{11}$ represent a hydrogen atom, an alkyl group having 1 to 18 carbon atoms or an aryl group having 6 to 36 carbon atoms, each being different, $j_{10}+j_{11}$ is within a range from 5 to 2,000, and preferably from 5 to 200, and b represents a block polymer composed of a block of each structural unit, and the following formula (17)

[Chemical formula 18]

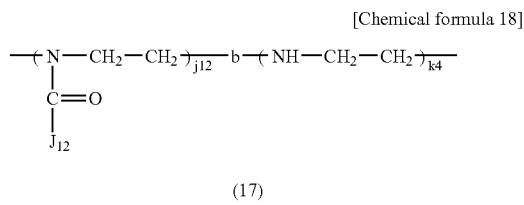

(17)

in the formula (17), $J_{12}$ represents an alkyl group having 1 to 18 carbon atoms or an aryl group having 6 to 36 carbon atoms, $j_{12}+k_4$ is within a range from 5 to 2,000, and preferably from 5 to 200, and b represents a block polymer composed of a block of each structural unit, because the structure is easily controlled.

In the linear polymers chain represented by the above formulas (10) to (17), one end is linked to the carbon atoms to which the side chain hydroxy group of the main chain epoxy resin is linked, whereas, a polymerization initiator residue is remained at the other end. Also various substituents or structures may be introduced by reacting the end having the polymerization initiator residue with a nucleophilic reagent.

Among the comb-shaped epoxy resin represented by the above formula (1) of the present invention, those having a side chain wherein $J_1$ to $J_{11}$ in the above formulas (10) to (16) are groups selected from the group consisting of hydrogen atom, methyl group, ethyl group and phenyl group, or a side chain wherein $J_{12}$ in the above formula (17) is a group selected from the group consisting of methyl group, ethyl group and phenyl group have high hydrophilicity and shows high micelle formation ability of the comb-shaped epoxy resin in water and are therefore preferably used. Those comprising an N-formylethyleneimine structural unit having a formyl group and an N-acetylethyleneimine structural unit having an acetyl group have particularly high hydrophilicity.

Higher hydrophilicity of the side chain polymer chain of the comb-shaped epoxy resin of the present invention makes it possible to form a polymer micelle more easily. Examples of the hydrophilic polymer chain include polyethyleneimine chain, poly(N-formylethyleneimine), poly(N-acetylethyleneimine) and poly(N-propionylethyleneimine).

When the side chain polymer chain is a block copolymer chain, a block copolymer chain of a polyethyleneimine block and a poly(N-acetylethyleneimine)block copolymer chain or a polyethyleneimine block and a poly(N-propionylethyleneimine) block has high hydrophilicity and shows high micelle formation ability, similarly.

When the side chain polymer chain is a random copolymer chain, the side chain has uniform hydrophilicity and shows high stability of the micelle.

Hydrophilicity of the side chain polymer chain is drastically influenced by the hydrogen cation concentration, the pH and the concentration of coexisting ions of the aqueous solution. In case of polyethyleneimine, as the pH of the aqueous solution decreases, imine nitrogen atom of polyethyleneimine is protonated and thus hydrophilicity remarkably increases.

To the side chain of the comb-shaped epoxy resin represented by the above formula (1), a polyethyleneimine-polyalkylene ether block unit, preferably a block unit represented by the following formula (18):

[Chemical formula 19]

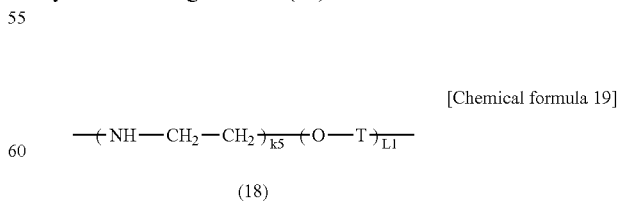

(18)

in the formula (18), k5 is within a range from 5 to 2,000, T is an alkylene group having 2 to 4 carbon atoms, and L1 is within a range from 5 to 2,000, or a poly N-acylethylene-imine-polyalkylene ether block unit, and preferably a block unit represented by the following formula (19):

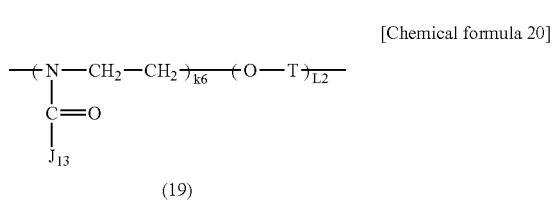

(19)

in the formula (19), k6 is within a range from 5 to 2,000, $J_{13}$ is a group selected from the group consisting of hydrogen atom, methyl group, ethyl group, phenyl group, T is an alkylene group having 2 to 4 carbon atoms, and L2 is within a range from 5 to 2,000, is linked.

Since the comb-shaped epoxy resin of the present invention contains a hydrophobic epoxy resin skeleton in a main chain and a linear polymer chain composed of at least one of a hydrophilic ethyleneimine structural unit and an N-acylethyleneimine unit in a side chain, it can form a polymer micelle in water, a hydrophilic solvent or a hydrophobic solvent and the polymer micelle thus obtained has a characteristic function which enables encapsulization.

The comb-shaped epoxy resin of the present invention forms a nanometer-scaled very small polymer micelle in water, and thus it is possible to encapsulize a functional compound, which is originally insoluble or slightly soluble in water, and to stably maintain the functional compound in water. For example, a fluorescent aromatic hydrocarbon such as pyrene can be encapsulized in the polymer micelle of the comb-shaped epoxy resin of the present invention in a molecular state and thus it can be stably present in water.

The comb-shaped epoxy resin of the present invention can encapsulize various functional compounds, and can be applied for various purposes including medicines and pesticides, cosmetics, perfumes, toners, liquid crystals, inks, coating materials and plastics.

Micelle formation ability of the comb-shaped epoxy resin of the present invention is remarkably improved even if the entire side chain hydroxy groups of the secondary alcohol structure moiety in the epoxy resin having a secondary alcohol structure are not necessarily substituted with a cationic polymer as compared with an epoxy resin wherein the entire hydroxy groups are not substituted with a cationic polymer. It is preferred for stable formation of a micelle that at least 50% of the entire groups are substituted, and it is more referred for exhibition of properties peculiar to the comb-shaped structure that at least 80% of the entire groups are substituted, and also it is particularly preferred that the entire hydroxy groups are substituted.

The comb-shaped epoxy resin containing a main chain composed of an epoxy resin skeleton having a propylene unit and a linear polymer chain obtained by polymerizing a cationic polymerizable monomer as a side chain, including the above-described comb-shaped epoxy resin can be prepared by a method for cation polymerization of a cationic polymerizable monomer using, as a cationic polymerization initiator, a modified epoxy resin wherein the side chain hydroxy group of the secondary alcohol structure moiety in an epoxy resin having a secondary alcohol structure is substituted with an alkylsulfonyloxy group, an arylsulfonyloxy group or a halogen atom.

As used herein, the secondary alcohol structure refers to a structure represented by the following formula (ii):

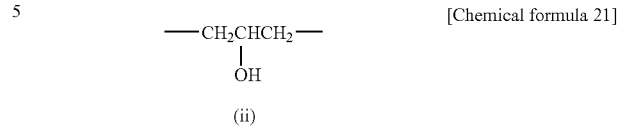

(ii)

and is a structure moiety which gives a propylene unit represented by the formula (i) in the comb-shaped epoxy of the present invention.

In the above method, the modified epoxy resin used as the cationic polymerization initiator is obtained by substituting a side chain hydroxy group in the epoxy resin having a secondary alcohol structure with a sulfonyloxy group or a halogen atom. The modified epoxy resin obtained by substituting with a sulfonyloxy group is preferable because a sulfonyloxy group of various structures can be used as a substituent and also cationic polymerization initiation activity and stability can be finely controlled.

The epoxy resin having a secondary alcohol structure may be any one which can give an epoxy resin skeleton having a propylene unit as a main chain of the comb-shaped epoxy resin, and an epoxy resin obtained from epihalohydrin and an aromatic dihydroxy compound and an epoxy resin obtained from a diglycidyl compound and an aromatic dihydroxy compound can be used.

The aromatic dihydroxy compound which gives an epoxy resin having a secondary alcohol structure may be any one having a phenolic hydroxy group which reacts with a glycidyl compound thereby to give a hydroxy group to a side chain.

As the aromatic dihydroxy compound, an aromatic dihydroxy compound used for synthesis of an epoxy resin can be used. When a rigid skeleton is given to the resulting epoxy resin, an aromatic dihydroxy compound such as a dihydroxy compound having a xanthene skeleton, a dihydroxy compound having a biphenylene skeleton or a dihydroxy compound having a bisphenol skeleton is preferably used.

Examples of the dihydroxy compound having a xanthene skeleton include an unsubstituted xanthene type dihydroxy compound such as 2,7-dihydroxyxanthene or 3,6-dihydroxyxanthene; a substituted xanthene type dihydroxy compound such as 3,6-dihydroxy-9,9-dimethylxanthene or 2,7-dihydroxy-1,3,4,5,6,8-hexamethyl-9-phenylxanthene; and a dibenzoxanthene type dihydroxy compound such as 2,11-dihydroxy-13-biphenyldibenzoxanthene. The aromatic dihydroxy compound having a xanthene skeleton represented by the following formula (2) or (3) is preferable because of its excellent heat resistance and solubility.

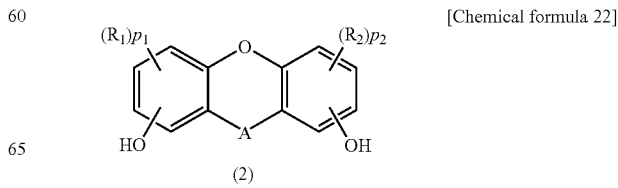

(2)

[Chemical formula 23]

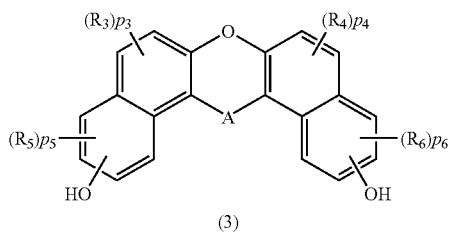

(3)

in the formula (2) and the formula (3), A represents a carbon atom, a methylene group, a methylene group substituted with an alkyl group having 1 to 4 carbon atoms, a methylene group substituted with a phenyl group, a methylene group substituted with a naphthyl group, a bimethylene group substituted with a phenyl group, a methylene group substituted with a 9-fluorenyl group, or a methylene group in which an alkyl group is further aromatic nucleus-substituted on the phenyl group, the naphthyl group or the biphenyl group, $R_1$ to $R_6$ represent a methyl group, $p_1$, $p_2$, $p_5$, $p_6$ each independently represents an integer of 0 to 3, and $p_3$ and $p_4$ each independently represents an integer of 0 to 2.

Examples of the dihydroxy compound having a biphenyl skeleton include 4,4'-biphenol and 4,4'-dihydroxy-3,3',5,5'-tetramethylbiphenyl. An aromatic dihydroxy compound having a biphenyl skeleton represented by the following formula (4) is particularly preferable because of its excellent heat resistance:

[Chemical formula 24]

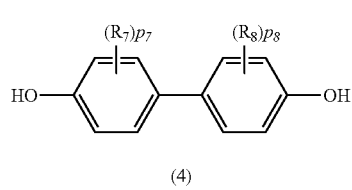

(4)

in the formula (4), $R_7$ and $R_8$ represent a methyl group, and $p_7$ and $p_8$ each independently represents an integer of 0 to 4.

Examples of the dihydroxy compound having a bisphenol skeleton include a bisphenol A type dihydroxy compound, bisphenol F type dihydroxy compound, a bisphenol S type dihydroxy compound, a bisphenol ACP type dihydroxy compound, a bisphenoldihydroxy compound, and diglycidyl ether obtained by chlorination or bromination of these bisphenol type dihydroxy compounds. An aromatic dihydroxy compound having a bisphenol skeleton represented by the following formula (5) is particularly preferable because of its high solubility:

[Chemical formula 25]

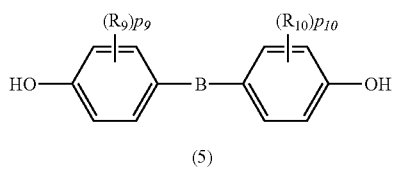

(5)

in the formula (5), B represents —C(CH$_3$)$_2$—, —CH(CH$_3$)—, —CH$_2$—, —C(CH$_3$)(CH$_2$CH$_3$)—, —C(CH$_3$)(C$_6$H$_5$)— or —SO$_2$—, $R_9$ and $R_{10}$ represent a methyl group or a halogen atom, and $p_9$ and $p_{10}$ each independently represents an integer of 0 to 4.

The diglycidyl compound, which gives an epoxy resin having a secondary alcohol structure, may be any one which reacts with the aromatic dihydroxy compound, thereby to give a hydroxy group to the side chain.

As the glycidyl compound, there can be used a diglycidyl compound used for the synthesis of an epoxy resin, for example, aromatic diglycidyl compound, alicyclic diglycidyl compound or aliphatic diglycidyl compound. When a rigid skeleton is given to the resulting epoxy resin, it is preferred to use an aromatic or alicyclic diglycidyl compound such as diglycidyl compound having a xanthene skeleton, diglycidyl compound having a biphenylene skeleton, diglycidyl compound having a bisphenol skeleton or a diglycidyl compound having a dicyclohexylalkane skeleton. When a flexible skeleton is introduced into the rigid skeleton, a diglycidyl compound having an alkylene skeleton or a polyoxyalkylene skeleton is preferably used.

Examples of the diglycidyl compound having a xanthene skeleton include an unsubstituted xanthene type diglycidyl ether such as 2,7-diglycidyloxyxanthene or 3,6-diglycidyloxyxanthene; a substituted xanthene type diglycidyl ether such as 3,6-diglycidyloxy-9,9-dimethylxanthene or 2,7-diglycidyloxy-1,3,4,5,6,8-hexamethyl-9-phenylxanthene; and a dibenzoxanthene type diglycidyl ether such as 2,11-diglycidyloxy-13-biphenyldibenzoxanthene. A diglycidyl compound having a xanthene skeleton represented by the following formula (20) or (21) is particularly preferable because of its excellent heat resistance and solubility:

[Chemical formula 26]

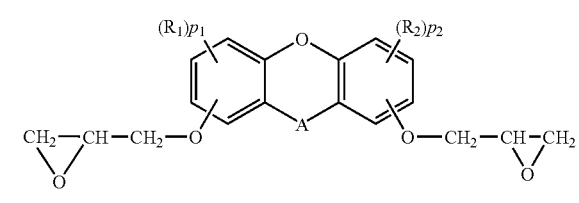

(20)

[Chemical formula 27]

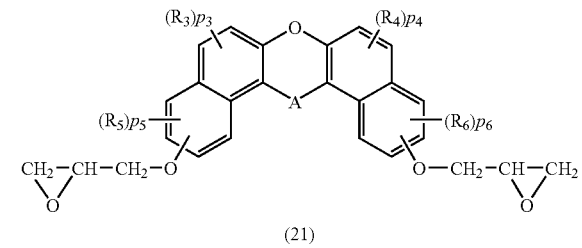

(21)

in the formula (20) and the formula (21), A represents a carbon atom, a methylene group, a methylene group substituted with an alkyl group having 1 to 4 carbon atoms, a methylene group substituted with a phenyl group, a methylene group substituted with a naphthyl group, a bimethylene group substituted with a phenyl group, a methylene group substituted with a 9-fluorenyl group, or a methylene group in which an alkyl group is further aromatic nucleus-substituted on the phenyl group, the naphthyl group or the biphenyl group, $R_1$ to $R_6$ represent a methyl group, $p_1$, $p_2$, $p_5$ and $p_6$ each independently represents an integer of 0 to 3, and $p_3$ and $p_4$ each independently represents an integer of 0 to 2.

Examples of the diglycidyl compound having a biphenylene skeleton include 4,4'-diglycidyloxybiphenyl and 4,4'-diglycidyloxy-3,3',5,5'-tetramethylbiphenyl. A diglycidyl compound having a biphenylene skeleton represented by the following formula (22) is particularly preferable because of its excellent heat resistance:

[Chemical formula 28]

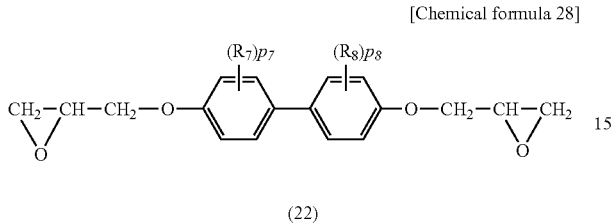

(22)

in the formula (22), $R_7$ and $R_8$ represent a methyl group, and $p_7$ and $p_8$ each independently represents an integer of 0 to 4.

Examples of the diglycidyl compound having a bisphenol skeleton include bisphenol A type diglycidyl ether, bisphenol F type diglycidyl ether, bisphenol S type diglycidyl ether, bisphenol ACP type diglycidyl ether, bisphenol L type diglycidyl ether, and diglycidyl ether obtained by chlorination or bromination of these bisphenol type diglycidyl ethers. A diglycidyl compound having a bisphenol skeleton represented by the following formula (23) is preferable because of its high solubility:

[Chemical formula 29]

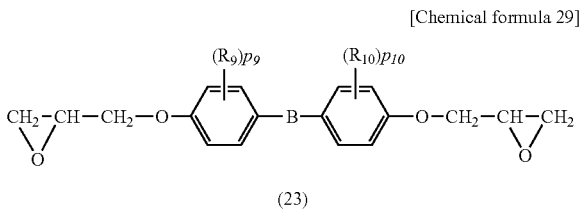

(23)

in the formula (23), B represents —C(CH$_3$)$_2$—, —CH(CH$_3$)—, —CH$_2$—, —C(CH$_3$)(CH$_2$CH$_3$)—, —C(CH$_3$)(C$_6$H$_5$)— or —SO$_2$—, $R_9$ and $R_{10}$ represent a methyl group or a halogen atom, and $p_9$ and $p_{10}$ each independently represents an integer of 0 to 4.

Examples of the diglycidyl compound having a dicyclohexylalkane skeleton include hydrogenated bisphenol A type diglycidyl ether. A diglycidyl compound having a dicyclohexylalkane skeleton represented by the following formula (24) is preferable because of its excellent solubility and weatherability:

[Chemical formula 30]

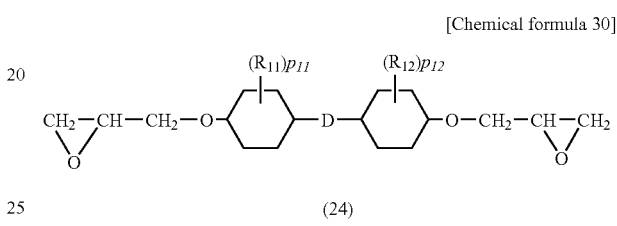

(24)

in the formula (24), D represents —C(CH$_3$)$_2$—, —CH(CH$_3$)—, —CH$_2$—, —C(CH$_3$)(CH$_2$CH$_3$)— or —C(CH$_3$)(C$_6$H$_5$), $R_{11}$ and $R_{12}$ represent a methyl group, and $p_{11}$ and $p_{12}$ each independently represents an integer of 0 to 4.

Examples of the diglycidyl compound having an alkylene skeleton or a polyoxyalkylene skeleton include neopentyl glycol diglycidyl ether, 1,4-butanediol diglycidyl ether, polyethylene glycol diglycidyl ether and polypropylene glycol diglycidyl ether. Diglycidyl compounds having an alkylene skeleton or a polyoxyalkylene skeleton represented by the following formulas (25) to (27) are particularly preferable because of their excellent flexibility:

[Chemical formula 31]

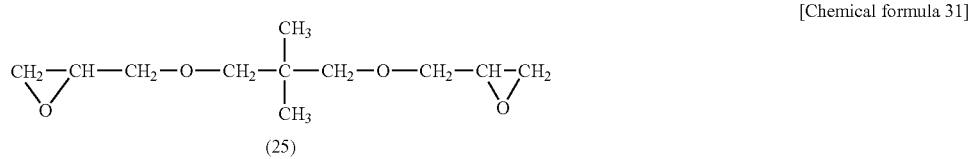

(25)

[Chemical formula 32]

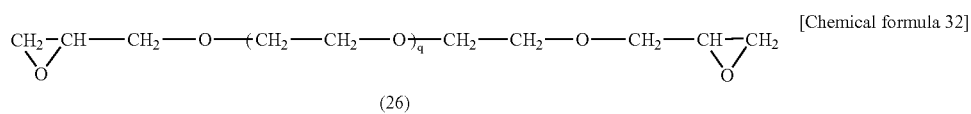

(26)

in the formula (26), q represents an integer of 0 to 100, and

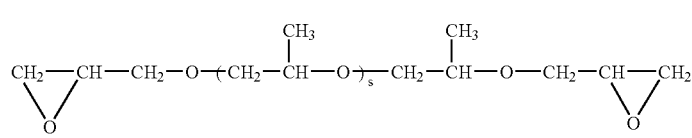

(27)

in the formula (27), s represents an integer of 0 to 100.

As the epihalohydrin used to prepare an epoxy resin having a secondary alcohol structure, epichlorohydrin and epibromohydrin can be used.

In the epoxy resin having a secondary alcohol structure obtained from the glycidyl group-containing compound or the aromatic hydroxy group-containing compound, the skeleton, which can be formed of the main chain of the epoxy resin, can be selected according to the kind of raw materials to be used. For example, in case of an epoxy resin obtained from an aromatic dihydroxy compound and epihalohydrin, when using only one kind of an aromatic dihydroxy compound, the main chain of the epoxy resin can form only one kind of a skeleton. When using plural kinds of aromatic dihydroxy compounds, an epoxy resin having plural kinds of skeletons can be obtained. In case of an epoxy resin obtained from an aromatic dihydroxy compound and a diglycidyl compound, when using the aromatic dihydroxy compound and the diglycidyl compound have the same skeleton, an epoxy resin composed of one kind of a skeleton is obtained. When using compounds each having a different skeleton or compounds each having plural kinds of structures, a structure having plural kinds of skeletons can be obtained. In case of an epoxy resin obtained from an aromatic dihydroxy compound and a diglycidyl compound, because of wide selection of the diglycidyl compound, an aliphatic skeleton or an alicyclic skeleton can be introduced into the main chain skeleton of the epoxy resin.

The reaction for substitution of a side chain hydroxy group of the secondary alcohol structure moiety in the epoxy resin having a secondary alcohol structure with an alkylsulfonyloxy group or an arylsulfonyloxy group is generally achieved by reacting with a sulfonylating agent such as sulfonic acid halide or sulfonic anhydride in the presence of an amine or an alkali inorganic salt.

Examples of the sulfonic acid halide include methanesulfonic acid halide which may be substituted with a halogen, such as methanesulfonic acid chloride, trifluoromethanemethanesulfonic acid chloride or trichloromethanesulfonic acid chloride; benzenesulfonic acid chloride which may be substituted with a methyl group or a nitro group, such as benzenesulfonic acid chloride, p-toluenesulfonic acid chloride, 2-nitrobenzenesulfonic acid chloride or 2,4-dinitrobenzenesulfonic acid chloride; and naphthalenesulfonic acid halide such as 1-naphthalenesulfonic acid chloride or 2-naphthalenesulfonic acid chloride.

Among these sulfonic acid chlorides, regarding the benzenesulfonic acid chloride which may be substituted with a methyl group or a nitro group, or the methanesulfonic acid chloride which may be substituted with a halogen atom, methanesulfonic acid chloride, trifluoromethanesulfonic acid chloride, trichloromethanesulfonic acid chloride, benzenesulfonic acid chloride, p-toluenesulfonic acid chloride, 2-nitrobenzenesulfonic acid chloride and 2,4-dinitrobenzenesulfonic acid chloride are preferable in view of availability of raw materials, regardless of high solubility of a modified epoxy resin as a cationic polymerization initiator. Particularly, p-toluenesulfonic acid choride si preferable because the modified epoxy resin as a cationic polymerization initiator has high stability and trifluoromethanesulfonic acid chloride is preferable because the modified epoxy resin as a cationic polymerization initiator has high cationic polymerization initiation ability.

Examples of the sulfonic anhydride include methanesulfonic anhydride which may be substituted with a halogen, such as methanesulfonic anhydride, trifluoromethanemethanesulfonic anhydride or trichloromethanesulfonic anhydride; and benzenesulfonic anhydride which may be substituted with a methyl group or a nitro group, such as benzenesulfonic anhydride, p-toluenesulfonic anhydride, 2-nitrobenzenesulfonic anhydride or 2,4-dinitrobenzenesulfonic anhydride.

Among these sulfonic anhydrides, a methanesulfonic anhydride which may be substituted with a halogen atom is preferable because the unreacted sulfonic anhydride can be distilled off under reduced pressure after the sulfonylation reaction of a hydroxyl group, and a methanesulfonic anhydride, a trifluoromethanesulfonic anhydride and a trichloromethanesulfonic anhydride are more preferable in view of availability of raw materials. A trifluoromethanesulfonic anhydride is particularly preferable because a modified epoxy resin as a cationic polymerization initiator has high cationic polymerization initiation ability.

The reaction for substitution of a hydroxy group with a group having a sulfonyloxy group due to a sulfonic acid halide is generally conducted in the presence of a base. Examples of the base include aromatic tertiary amine such as pyridine, 4-dimethylaminopyridine or N,N-dimethylaniline; aliphatic tertiary amine such as triethylamine, N,N,N',N'-tetramethylethylenediamine or 1,4-diazabicyclo[2,2,2]octane; and alkali inorganic salt such as potassium carbonate or calcium hydroxide.

The proportion of the substitution of a side chain hydroxy group of the epoxy resin having a secondary alcohol structure with a sulfonyloxy group-containing group can be adjusted by the amount of the sulfonic acid halide to be added and the kind of the base. For example, when the entire hydroxy groups are substituted with a group having a sulfonyloxy group, excess molar amount of a sulfonic acid halide or a sulfonic anhydride may be used to a hydroxy group in the epoxy resin having a secondary alcohol structure.

When the hydroxy groups are partially substituted with a group having a sulfonyloxy group, an aromatic tertiary amine such as pyridine or 4-dimethylaminopyridine may be used as the base and small excess molar amount of a sulfonic acid halide may be used to a hydroxy group, and also the reaction temperature may be maintained at about room temperature.

When a glycidyl group is remained at the end of the epoxy resin having a secondary alcohol structure, the terminal structure of the resulting modified epoxy resin can be adjusted by adjusting the kind of the base and the reaction conditions. When an excess amount of a sulfonic acid halide is used to a hydroxy group using an aromatic tertiary amine such as pyridine as the base, hydroxy groups of the side chain in the epoxy resin having a secondary alcohol structure are completely substituted with a sulfonyloxy group-containing group and also a glycidyl group at the end of the main chain reacts with excess sulfonic acid halide existing at the end to form a terminal structure having a sulfonyloxy group-containing group. It is also possible to polymerize a cationic polymerizable monomer from the terminal structure. The reaction temperature may be adjusted within a range from room temperature to 80° C., and preferably from 40 to 60° C.

A modified epoxy resin wherein a glycidyl group is remained at the end of the main chain may be prepared by using, as a bare, an aliphatic tertiary amine such as N,N,N',N'-tetramethyl-1,3-propanediamine, N,N,N',N'-tetramethylethylenediamine, N,N',N'-tetramethyl-1,6-hexanediamine or triethylamine, using a sulfonic acid halide in an equimolar or small excess amount to a hydroxy group, and maintaining at the reaction temperature within a range from −20 to 10° C., and preferably from −10 to 5° C. for one hour.

Examples of the solvent used to prepare a modified epoxy resin as a cationic polymerization initiator include aromatic solvent such as toluene or xylene; aprotic polar solvent such as acetonitrile or dimethylacetamide; chlorine-based solvent such as chloroform or methylene chloride; and ether-based solvent such as diethyl ether or tetrahydrofuran.

The reaction for the substitution of a hydroxy group with a group having a sulfonyloxy group due to a sulfonic anhydride may be conducted using the above base and the solvent in combination, similar to the case of the sulfonic acid halide. In case of a sulfonic anhydride having high volatility such as trifluoromethanesulfonic anhydride, the reaction for the substitution with a sulfonyloxy group can be achieved by exposing to steam of the sulfonic anhydride. After the substitution reaction, the resulting sulfonic acid and the unreacted sulfonic anhydride can be distilled off under reduced pressure.

The modified epoxy resin as the cationic polymerization initiator can be obtained by a sulfonylating agent such as sulfonate ester in place of the sulfonic acid halide or sulfonic anhydride.

Examples of the cationic polymerizable monomer, which is cationically polymerized using a modified epoxy resin as a cationic polymerization initiator used to prepare the comb-shaped epoxy resin of the present invention, include alkyleneimine monomer, for example, aziridine such as ethyleneimine, propyleneimine, N-(tetrahydropyranyl)ethyleneimine or N-(t-butyl)ethyleneimine, or azetidine; oxazoline monomer, for example, (perfluorooctyl)propyl)oxazoline such as 2-oxazoline, 2-methyloxazoline, 2-ethyloxazoline, 2-phenyloxazoline, 2-stearyloxazoline or 2-(3-2-alkyloxazoline, 2-alkenyloxazoline such as 2-vinyloxazoline, 2-isopropenyloxazoline or 2-oleyloxazoline, or 2-aryloxazoline such as 2-phenyloxazoline or 2-benzyloxazoline; oxirane monomer such as ethylene oxide or propylene oxide; oxetane monomer such as oxetane; vinyl ether monomer such as tetrahydrofuran, methyl vinyl ether or ethyl vinyl ether; and acetal such as trioxane.

The cationic polymerization conditions when using the modified epoxy resin as a cationic polymerization initiator used to prepare the comb-shaped epoxy resin of the present invention are similar to conventionally known cationic polymerization conditions when using an alkylsulfonate ester such as methyl p-toluenesulfonate or methyl trifluoromethanesulfonate as a cationic polymerization initiator, but drastically vary according to the structure of the alkylsulfonate ester, the structure of the epoxy resin, and the kind of the cationic polymerizable monomer.

When sulfonic acid of a sulfonate ester of the cationic polymerization initiator has higher acidity, the sulfonate ester is likely to be cleaved into an ester carbon cation and a sulfonic acid anion. Therefore, when sulfonic acid of a sulfonyloxy-substituted modified epoxy resin used to prepare the comb-shaped epoxy resin of the present invention has higher acidity, the cationic polymerization proceeds at lower reaction temperature.

When the epoxy resin, which forms a main chain of the sulfonyloxy-substituted modified epoxy resin used to prepare the comb-shaped epoxy resin of the present invention is rigid and causes larger steric hindrance, long polymerization time is required.

The comb-shaped epoxy resin having a side chain composed of an ethyleneimine structural unit of the present invention can be obtained directly by cationic polymerization of ethyleneimine using the cationic polymerization initiator, or obtained indirectly by hydrolyzing a comb-shaped epoxy resin having a polymer chain composed of an N-acylethyleneimine structural unit as a side chain, which is obtained by cationic polymerization of the above-described oxazoline monomer. However, a comb-shaped epoxy resin having a linear polyethyleneimine side chain is obtained only by hydrolyzing a comb-shaped epoxy resin having a polymer chain composed only of an N-acylethyleneimine structural unit as a side chain.

A random polymer chain composed of plural kinds of N-acylethyleneimine structural units can be formed by polymerizing using plural kinds of oxazoline monomers, and also a block copolymer can be prepared by multistage polymerization using different kinds of oxazoline monomers because the cationic polymerization of the oxazoline is generally living polymerization. Consequently, the side chain or the random polymer chain of the comb-shaped epoxy resin of the present invention can be employed as a block polymer chain. For example, when 2-phenyloxazoline is cationic-polymerized using the cationic polymerization initiator used to prepare the comb-shaped epoxy resin of the present invention and then 2-methyloxazoline is polymerized, there can be prepared a comb-shaped epoxy resin containing, as a side chain, a block-polymerized polyacylethyleneimine wherein a poly(N-benzoylethyleneimine) chain is directly linked to an epoxy resin and poly(N-acetylethyleneimine) is directly linked to the poly(N-benzoylethyleneimine).

When partial hydrolysis of a polymer chain composed of an N-acylethyleneimine structural unit is conducted, a portion of N-acylethyleneimine structural units in the polymer chain are hydrolyzed to form an ethyleneimine structural unit, and thus making it possible to obtain a comb-shaped epoxy resin having a random polymer chain composed of an N-acylethyleneimine structural unit and an ethyleneimine structural unit in the side chain.

When a polymer chain composed of an N-acylethyleneimine structural unit before hydrolysis is a block polymer, selective hydrolysis of an N-acylimino group can be conducted by controlling the hydrolysis conditions, and thus making it possible to prepare a comb-shaped epoxy resin having a diblock polymerside chain composed of a polyethyleneimine block and an N-acylpolyethyleneimine block, such as block copolymer chain of a polyethyleneimine block and a poly(N-acetylethyleneimine) block, or block copolymer chain of a polyethyleneimine block and a poly(N-propionylethyleneimine) block.

Also when a polymer chain composed of an N-acylethyleneimine structural unit before hydrolysis is a random polymer, a comb-shaped epoxy resin having a random copolymer side chain of an ethyleneimine structural unit and an N-acylethyleneimine structural unit.

According to the method of the present invention, the comb-shaped epoxy resin can be simply prepared by using, as a cationic polymerization initiator, a modified epoxy resin obtained by substituting a side chain hydroxy group of the secondary alcohol structure moiety in the epoxy resin having a secondary alcohol structure with an alkylsulfonyloxy group or an arylsulfonyl group, followed by cationic polymerization of a cationic polymerizable monomer.

For example, a comb-shaped epoxy resin wherein a cationic polymer is introduced into an epoxy resin side chain, or an analogue structure thereof can be prepared by directly reacting a modified epoxy resin wherein a side chain hydroxy group of the secondary alcohol structure moiety in the epoxy resin having a secondary alcohol structure is substituted with an alkylsulfonyloxy group or an arylsulfonyl group with a cationic polymer, or indirectly linking an epoxy resin having a secondary alcohol structure to a cationic polymer using a reactive linking agent such as polyisocyanate.

Regarding the comb-shaped epoxy resin wherein a double block polymer chain composed of a poly N-acylethyleneimine block unit and a polyalkylene ether block unit is introduced, the substitution reaction of polyalkylene glycol can be conducted after cation living polymerization of oxazoline is conducted using the modified epoxy resin as a cationic polymerization initiator. For example, the comb-shaped epoxy resin can be obtained by cation living polymerization of oxazoline using, as a cationic polymerization initiator, a modified epoxy resin wherein a side chain hydroxy group of the secondary alcohol structure moiety in the epoxy resin having a secondary alcohol structure is substituted with an alkylsulfonyloxy group or an arylsulfonyl group or halogen, and substituting the resulting polyoxazoline active terminal sulfonyloxy residue with a polyalkylene glycol such as polyethylene glycol or polypropylene glycol.

A comb-shaped epoxy resin wherein a double block polymer chain composed of a poly N-ethyleneimine block unit and a polyalkylene ether block unit can be simply obtained by the hydrolysis reaction of the poly N-acylethyleneimine block unit in the double block of the comb-shaped epoxy resin having a double block composed of the poly N-acylethyleneimine block unit and the polyalkylene ether block unit obtained by the above method using an acid or base catalyst.

By reacting a sulfonyloxy group existing at the end of the side chain of the comb-shaped epoxy resin of the present invention with a nucleophilic reagent, various substituents or structures can be introduced into the end of the cationic polymer.

EXAMPLES

The present invention will now be described in more detail by way of examples. In the following examples, parts and percentages are by weight unless otherwise specified.

Synthesis Example 1

A toluene (0.5 ml)-acetonitrile (0.5 ml) mixed solution containing 0.347 g of a bisphenol A type linear epoxy resin having a secondary hydroxy group in a side chain (manufactured by DAINIPPON INK & CHEMICALS Co., Ltd., "AM-040-P", side chain hydroxy group: 1 mmol) was stirred while ice cooling with ice including a salt under a nitrogen atmosphere and then 0.208 ml (1.5 mmol (1.5 equivalents of a side chain hydroxy group in the epoxy resin), 0.152 g) of triethylamine and 0.0166 ml (0.1 mmol (0.1 equivalents of a side chain hydroxy group in the epoxy resin), 0.013 g) of N,N,N',N'-tetramethyl-1,3-propanediamine were added. A toluene (1 ml) solution containing 2.09 g (1.5 mmol (1.5 equivalents of a side chain hydroxy group in the epoxy resin)) of p-toluenesulfonic acid chloride was added dropwise while stirring with ice cooling under a nitrogen atmosphere. After the completion of the dropwise addition, the reaction solution was stirred at the same temperature for one hour, immediately mixed with 2 ml of water, vigorously stirred with ice cooling, extracted with ethyl acetate, washed with water and an aqueous saturated brine solution, dried over magnesium sulfate, filtrated and then concentrated under reduced pressure. The resulting colorless solid was diluted with 1 ml of chloroform and added dropwise in 10 ml of methanol. The pale orange gel-like precipitate solution thus obtained was ground with ice cooling and the resulting white powder precipitate was suction-filtered, washed in turn with cold methanol, cold water and cold methanol and then vacuum dried at room temperature to obtain a modified epoxy resin (1). The amount was 0.348 g and the yield was 69%.

1H-NMR (manufactured by JEOL Ltd., JNM-LA300, 300 MHz) analysis of the resulting modified epoxy resin (1) revealed that a rate of modification of a hydroxy group into a p-toluenesulfonyl group is 94% and a residual rate of a glycidyl group was 99%.

Synthesis Example 2

10 ml of a chloroform solution containing 3.47 g of bisphenol A type linear epoxy resin having a secondary hydroxy group in a side chain (manufactured by DAINIPPON INK & CHEMICALS Co., Ltd., "AM-040-P", side chain hydroxy group: 10 mmol) was stirred with ice cooling under a nitrogen atmosphere and 8.04 ml (100 mmol (10 equivalents of a side chain hydroxy group in the epoxy resin), 7.9 g) of pyridine was added. 10 ml of a chloroform solution containing 19 g (100 mmol (10 equivalents of a side chain hydroxy group in the epoxy resin)) of p-toluenesulfonic acid chloride was added dropwise while stirring with ice cooling under a nitrogen atmosphere, followed by stirring with ice cooling for one hour. After reacting at 40° C. for 3 hours and a half, 70 ml of chloroform was added to the resulting pale yellow transparent solution and 10.74 ml (99 mmol (9.9 equivalents of a side chain hydroxy group in the epoxy resin), 8.67 g) of N,N-dimethylethylenediamine was added dropwise while stirring with ice cooling. After rapid heat generation due to dropwise addition was suppressed and the liquid temperature was maintained at 25° C. or lower by sufficiently stirring with ice cooling, 100 ml of an aqueous 10% hydrochloric acid solution to the resulting yellow solution, followed by extraction with chloroform. Furthermore, the resulting extract was washed in turn with an aqueous 10% hydrochloric acid solution, an aqueous sodium hydrogen carbonate solution and water, dried over magnesium sulfate, suction-filtered and then concentrated under reduced pressure. The resulting yellow viscous liquid was diluted with 10 ml of chloroform, added dropwise in 100 ml of methanol while stirring with ice cooling and then stirred with ice cooling for one hour. The resulting g yellow precipitate was suction-filtered, washed with methanol and then vacuum dried at room temperature to obtain a modified epoxy resin (2). The amount was 4.34 g and the yield was 83%.

1H-NMR (300 MHz) analysis of the resulting modified epoxy resin (2) revealed that a rate of modification of a hydroxy group into a p-toluenesulfonyl group is 100% and the epoxy resin is terminated with a 3-chloro-2-(p-toluenesulfonyloxy)-propyl group.

Synthesis Example 3

[Synthesis of xanthene-biphenylene Copolymer Type Linear Epoxy Resin]

1.555 g (manufactured by DAINIPPON INK & CHEMICALS Co., Ltd., "EXA7335", 3.2 mmol) of 2,7-diglycidyloxy-1,3,4,5,6,8-hexamethyl-9-phenylxanthene, 0.238 g (0.8 mmol) of 4,4'-diglycidyloxybiphenyl, 0.67 g (3.6 mmol) of 4,4'-dihydroxybiphenyl and 0.0106 g (0.02 mmol) of ethyltriphenylphosphonium acetate in a 70% methanol solution were reacted for 4 hours by stirring while heating to 160° C. in 2.463 g of N,N-dimethylacetamide under a nitrogen atmosphere. After cooling, a pale yellow transparent semi-solid reaction solution was diluted with 11.495 g of N,N-dimethylacetamide and then added dropwise in ice. The resulting white massive precipitate was suction-filtered, washed with ice water and then boiled in 200 ml of water for 30 minutes while vigorously stirring. After cooling, the precipitate obtained by decantation was ground and the powered precipitate was washed with water and methanol, and then vacuum dried at 60° C. to obtain a xanthene-biphenylene copolymer type linear epoxy resin. The amount of the resulting xanthene-biphenylene copolymer type linear epoxy resin was 2.33 g and the yield was 95%.

Synthesis Example 4

In the same manner as in Synthesis Example 2, except that 3.47 g of the bisphenol A type linear epoxy resin having a secondary hydroxy group in a side chain was replaced by 3.42 g (side chain hydroxy group: 10 mmol) of the xanthene-biphenylene copolymer type linear epoxy resin having a secondary hydroxy group in a side chain obtained in Synthesis Example 3, a modified epoxy resin (3) was obtained. The amount was 2.97 g and the yield was 60%.

1H-NMR (300 MHz) analysis of the resulting modified epoxy resin (3) revealed that a rate of modification of a hydroxy group into a p-toluenesulfonyl group is 100% and the epoxy resin is terminated with a 3-chloro-2-(p-toluenesulfonyloxy)-propyl group.

Synthesis Example 5

[Synthesis of xanthene-bisphenol A Copolymer Type Linear Epoxy Resin]

In the same manner as in Synthesis Example 3, except that 1.555 g (manufactured by DAINIPPON INK & CHEMICALS Co., Ltd., "EXA7335", 3.2 mmol) of 2,7-diglycidyloxy-1,3,4,5,6,8-hexamethyl-9-phenylxanthene, 0.238 g (0.8 mmol) of 4,4'-diglycidyloxybiphenyl and 0.67 g (3.6 mmol) of 4,4'-dihydroxybiphenyl, were replaced by 1.944 g (manufactured by DAINIPPON INK & CHEMICALS Co., Ltd., "EXA7335", 4.0 mmol) of 2,7-diglycidyloxy-1,3,4,5,6,8-hexamethyl-9-phenylxanthene and 0.821 g (3.6 mmol) of bisphenol A, a xanthene-bisphenol A copolymer type linear epoxy resin was obtained. The amount of the resulting xanthene-bisphenol A copolymer type linear epoxy resin was 2.69 g and the yield was 97%.

Synthesis Example 6

In the same manner as in Synthesis Example 4, except that 3.47 g of the bisphenol A type linear epoxy resin having a secondary hydroxy group in a side chain was replaced by 3.84 g (side chain hydroxy group: 10 mmol) of the xanthene-bisphenol A copolymer type linear epoxy resin having a secondary hydroxy group in a side chain obtained in Synthesis Example 5, a modified epoxy resin (4) was obtained. The amount was 3.44 g and the yield was 64%.

1H-NMR (300 MHz) analysis of the resulting modified epoxy resin (4) revealed that a rate of modification of a hydroxy group into a p-toluenesulfonyl group is 100% and the epoxy resin is terminated with a 3-chloro-2-(p-toluenesulfonyloxy)-propyl group.

Synthesis Example 7

[Synthesis of xanthene-biphenylene-neopentylene Copolymer Type Linear Epoxy Resin]

In the same manner as in Synthesis Example 3, except that 0.238 g (0.8 mmol) of 4,4'-diglycidyloxybiphenyl was replaced by 0.173 g (0.8 mmol) of neopentyl glycol diglycidyl ether, a xanthene-biphenylene-neopentylene copolymer type linear epoxy resin was obtained. The amount of the resulting xanthene-biphenylene-neopentylene copolymer type linear epoxy resin was 2.28 g and the yield was 95%.

Synthesis Example 8

In the same manner as in Synthesis Example 4, except that 3.47 g of the bisphenol A type linear epoxy resin having a secondary hydroxy group in a side chain was replaced by 3.33 g (side chain hydroxy group: 10 mmol) of the xanthene-biphenylene-neopentylene copolymer type linear epoxy resin having a secondary hydroxy group in a side chain obtained in Synthesis Example 7, a modified epoxy resin (5) was obtained. The amount was 2.87 g and the yield was 59%.

1H-NMR (300 MHz) analysis of the resulting modified epoxy resin (5) revealed that a rate of modification of a hydroxy group into a p-toluenesulfonyl group is 100% and the epoxy resin is terminated with a 3-chloro-2-(p-toluenesulfonyloxy)-propyl group.

Synthesis Example 9

[Synthesis of xanthene-biphenylene-hydrogenated bisphenol A Copolymer Type Linear Epoxy Resin]

In the same manner as in Synthesis Example 3, except that 0.238 g (0.8 mmol) of 4,4'-diglycidyloxybiphenyl was replaced by 0.282 g (0.8 mmol) of a hydrogenated bisphenol A diglycidyl ether, a xanthene-biphenylene-hydrogenated bisphenol A copolymer type linear epoxy resin was obtained. The amount of the resulting xanthene-biphenylene-hydrogenated bisphenol A copolymer type linear epoxy resin was 2.42 g and the yield was 96%.

Synthesis Example 10

In the same manner as in Synthesis Example 4, except that 3.47 g of the bisphenol A type linear epoxy resin having a secondary hydroxy group in a side chain was replaced by 3.48 g (side chain hydroxy group: 10 mmol) of the xanthenebiphenylene-hydrogenated bisphenol A copolymer type linear epoxy resin having a secondary hydroxy group in a side chain obtained in Synthesis Example 9, a modified epoxy resin (6) was obtained. The amount was 3.02 g and the yield was 60%.

1H-NMR (300 MHz) analysis of the resulting modified epoxy resin (6) revealed that a rate of modification of a hydroxy group into a p-toluenesulfonyl group is 100% and the epoxy resin is terminated with a 3-chloro-2-(p-toluenesulfonyloxy)-propyl group.

Synthesis Example 11

0.5 ml of a chloroform solution containing 0.347 g (manufactured by DAINIPPON INK & CHEMICALS Co., Ltd., "AM-040-P", side chain hydroxy group: 1 mmol) of a bisphenol A type linear epoxy resin having a secondary hydroxy group in a side chain was stirred while ice cooling with ice including a salt under a nitrogen atmosphere and 0.096 ml (1.2 mmol (1.2 equivalents of a side chain hydroxy group in the epoxy resin), 0.095 g) of pyridine was added. 0.197 ml (1.2 mmol (1.2 equivalents of a side chain hydroxy group in the epoxy resin)) of trifluoromethanesulfonic anhydride was added dropwise while stirring with ice cooling under a nitrogen atmosphere, followed by stirring with ice cooling for 2 hours. After reacting in cold water for 2 hours, the resulting slightly turbid solution was suction-filtered and then vacuum-dried to obtain a modified epoxy resin (7). The amount was 0.344 g and the yield was 72%.

1H-NMR (300 MHz) analysis of the resulting modified epoxy resin (7) revealed that a rate of modification of a hydroxy group into a p-toluenesulfonyl group is 99% and a residual rate of a glycidyl group was 60%.

Synthesis Example 12

In the same manner as in Synthesis Example 11, except that 3.47 g of the bisphenol A type linear epoxy resin having a secondary hydroxy group in a side chain was replaced by 3.42 g (side chain hydroxy group: 10 mmol) of the xanthene-biphenylene copolymer type linear epoxy resin having a secondary hydroxy group in a side chain obtained in Synthesis Example 3, a modified epoxy resin (8) was obtained. The amount was 3.02 g and the yield was 60%.

1H-NMR (300 MHz) analysis of the resulting modified epoxy resin (8) revealed that a rate of modification of a hydroxy group into a trifluoromethanesulfonyl group is 92% and the epoxy resin is terminated with a 2,3-di(trifluoromethanesulfonyloxy)propyl group.

Synthesis Example 13

[Synthesis of xanthene-biphenylene Copolymer Type Linear Epoxy Resin (2)]

0.972 g (manufactured by DAINIPPON INK & CHEMICALS Co., Ltd., "EXA7335", 2 mmol) of 2,7-diglycidyloxy-1,3,4,5,6,8-hexamethyl-9-phenylxanthene, 0.372 g (2 mmol) of 4,4'-dihydroxybiphenyl, 2.62 mg (0.01 mmol) of triphenylphosphine and 1.34 g of N,N-dimethylacetamide were reacted under a nitrogen atmosphere at 160° C. for 4 hours. After cooling, the reaction solution was diluted with N,N-dimethylacetamide so as to adjust the nonvolatile content to 15% and then added dropwise in 100 ml of water. The resulting white turbid dispersion was stirred at room temperature for one hour. After the dispersion was centrifuged and suction-filtered, the resulting precipitate was washed with methanol and then vacuum-dried at 60° C. to obtain a xanthene-biphenylene copolymer type linear epoxy resin. The amount of the resulting xanthene-biphenylene copolymer type linear epoxy resin was 1.033 g and the yield was 77%.

Synthesis Example 14

0.336 g (side chain hydroxy group: 1 mmol) of the xanthene-biphenylene copolymer type linear epoxy resin having a secondary hydroxy group in a side chain obtained in Synthesis Example 13 and 10 ml of pyridine were stirred while ice cooling under a nitrogen atmosphere and p-toluenesulfonic acid chloride (1.5 mmol (1.5 equivalents of a side chain hydroxy group in the epoxy resin)) and dimethylaminopyridine (0.15 mmol (0.15 equivalents of a side chain hydroxy group in the epoxy resin)) were added, followed by ice cooling for one hour and further stirring at room temperature for 24 hours. The reaction solution was added to 100 ml of ice water and, after shaking and stirring, the solution was allowed to stand in a refrigerator over 3 nights. The colorless supernatant was removed by decantation and, after suction filtration, the resulting powdered white precipitate was added to 40 g of ice. After stirring for 30 minutes, the solution was suction-filtered, washed with ice water, washed with ice methanol and then vacuum-dried at 30° C. to obtain a modified epoxy resin (9). The amount was 0.392 g and the yield was 80%.

1H-NMR (300 MHz) analysis of the resulting modified epoxy resin (9) revealed that a rate of modification of a hydroxy group into a p-toluenesulfonyl group is 58%.

Example 1

0.354 g (p-toluenesulfonyloxy group: 0.708 mmol) of the modified epoxy resin (1) obtained in Synthesis Example 1, 1.5 ml (1.51 g, 17.7 mmol) of 2-methyloxazoline and 1 ml of N,N-dimethylacetamide were stirred under a nitrogen atmosphere at 100° C. for 48 hours. To the resulting yellow semi-solid, 20 ml of ethyl acetate was added, followed by vigorous stirring at room temperature, filtration, washing with ethyl acetate and further vacuum drying to obtain 1.67 g of a white powdered solid. The yield on polymerization was 90%. 1H-NMR analysis revealed that the resulting solid is a comb-shaped polymer containing a bisphenol A type epoxy resin as a main chain and a poly(N-acetylethyleneimine) having a number average polymerization degree of 33 as measured by an integral ratio of o-position hydrogen (δ 7.82 ppm) of a p-toluenesulfonyloxy group to ethylene hydrogen (δ 3.47 ppm) of poly(N-acetylethyleneimine as a side chain.

Example 2

In the same manner as in Example 1, except that 0.354 g (p-toluenesulfonyloxy group: 0.708 mmol) of the modified epoxy resin (1) obtained in Synthesis Example 1 was replaced by 0.147g (p-toluenesulfonyloxy group: 0.354 mmol) of the modified epoxy resin (2) obtained in Synthesis Example 2, 1.51 g of a pale yellow powdered solid was obtained. The yield on polymerization was 92%. In the same manner as in Example 1, 1H-NMR analysis revealed that the resulting solid contains a bisphenol A type epoxy resin as a main chain and poly(N-acetylethyleneimine) having a number average polymerization degree of 70 as a side chain.

Example 3

In the same manner as in Example 1, except that 0.354 g (p-toluenesulfonyloxy group: 0.708 mmol) of the modified epoxy resin (1) obtained in Synthesis Example 1 was replaced by 0.089 g (p-toluenesulfonyloxy group: 0.20 mmol) of the modified epoxy resin (3) obtained in Synthesis Example 4, 1.50 ml (1.51 g, 17.7 mmol) of 2-methyloxazoline was replaced by 0.846 ml (0.850 g, 10 mmol) of 2-methyloxazoline, 1 ml of N,N-dimethylacetamide was replaced by 3.5 ml of N,N-dimethylacetamide, and the reaction time of 48 hours was replaced by 134 hours, 0.347 g of a white powdered solid was obtained. The yield on polymerization was 37%. 1H-NMR analysis revealed that the resulting solid contains a xanthene-biphenylene copolymer type epoxy resin as a main chain and poly(N-acetylethyleneimine) having a number average polymerization degree of 25 as a side chain.

Example 4

In the same manner as in Example 1, except that 0.354 g (p-toluenesulfonyloxy group: 0.708 mmol) of the modified epoxy resin (1) obtained in Synthesis Example 1 was replaced by 0.171 g (p-toluenesulfonyloxy group: 0.354 mmol) of the modified epoxy resin (4) obtained in Synthesis Example 6, 1 ml of N,N-dimethylacetamide was replaced by 3.5 ml of N,N-dimethylacetamide, and the reaction time of 48 hours was replaced by 144 hours, 0.704 g of a white powdered solid was obtained. The yield on polymerization was 42%. 1H-NMR analysis revealed that the resulting solid contains a xanthene-biphenylene A copolymer type epoxy resin as a main chain and poly(N-acetylethyleneimine) having a number average polymerization degree of 32 as a side chain.

Example 5

In the same manner as in Example 1, except that 0.354 g (p-toluenesulfonyloxy group: 0.708 mmol) of the modified epoxy resin (1) obtained in Synthesis Example 1 was replaced by 0.155 g (p-toluenesulfonyloxy group: 0.354 mmol) of the modified epoxy resin (5) obtained in Synthesis Example 8, 1 ml of N,N-dimethylacetamide was replaced by 3.5 ml of N,N-dimethylacetamide, and the reaction time of 48 hours was replaced by 144 hours, 0.664 g of a white powdered solid was obtained. The yield on polymerization was 40%. 1H-NMR analysis revealed that the resulting solid contains a xanthene-biphenylene copolymer type epoxy resin as a main chain and poly(N-acetylethyleneimine) having a number average polymerization degree of 30 as a side chain.

Example 6

In the same manner as in Example 1, except that 0.354 g (p-toluenesulfonyloxy group: 0.708 mmol) of the modified epoxy resin (1) obtained in Synthesis Example 1 was replaced by 0.16 g (p-toluenesulfonyloxy group: 0.354 mmol) of the modified epoxy resin (6) obtained in Synthesis Example 10, 1 ml of N,N-dimethylacetamide was replaced by 3.5 ml of N,N-dimethylacetamide, and the reaction time of 48 hours was replaced by 144 hours, 0.649 g of a white powdered solid was obtained. The yield on polymerization was 39%. 1H-NMR analysis revealed that the resulting solid contains a xanthene-biphenylene copolymer type epoxy resin as a main chain and poly(N-acetylethyleneimine) having a number average polymerization degree of 27 as a side chain.

Example 7

In the same manner as in Example 1, except that 0.354 g (p-toluenesulfonyloxy group: 0.708 mmol) of the modified epoxy resin (1) obtained in Synthesis Example 1 was replaced by 0.085 g (trifluoromethanesulfonyloxy group: 0.177 mmol) of the modified epoxy resin (7) obtained in Synthesis Example 11, 1 ml of N,N-dimethylacetamide was replaced by 3.5 ml of N,N-dimethylacetamide, and the reaction time of 48 hours was replaced by 144 hours, 1.49 g of a white powdered solid was obtained. The yield on polymerization was 93%. 1H-NMR analysis revealed that the resulting solid contains a bisphenol A type epoxy resin as a main chain and poly(N-acetylethyleneimine) having a number average polymerization degree of 140 as a side chain.

Example 8

In the same manner as in Example 1, except that 0.354 g (p-toluenesulfonyloxy group: 0.708 mmol) of the modified epoxy resin (1) obtained in Synthesis Example 1 was replaced by 0.378 g (trifluoromethanesulfonyloxy group: 0.885 mmol) of the modified epoxy resin (8) obtained in Synthesis Example 12, 1 ml of N,N-dimethylacetamide was replaced by 3.5 ml of N,N-dimethylacetamide, and the reaction time of 48 hours was replaced by 144 hours, 1.56 g of a white powdered solid was obtained. The yield on polymerization was 83%. 1H-NMR analysis revealed that the resulting solid contains a xanthene-biphenylene copolymer type epoxy resin as a main chain and poly(N-acetylethyleneimine) having a number average polymerization degree of 25 as a side chain.

Example 9

0.13 g (p-toluenesulfonyloxy group: 0.089 mmol) of the modified epoxy resin (9) obtained in Synthesis Example 14, 1.5 ml (1.51 g, 17.7 mmol) of 2-methyloxazoline and 5 ml of N,N-dimethylacetamide were stirred under a nitrogen atmosphere at 100° C. for 24 hours. The resulting pale yellow and slightly viscous solution was added in 30 ml of ethyl acetate while vigorously stirring at room temperature, and the resulting white turbid solution was further stirred at room temperature for one hour. After the solution was allowed to stand, the supernatant was removed by decantation and 20 ml of ethyl acetate was added to the precipitate, followed by stirring at room temperature for 30 minutes. After the solution was allowed to stand, the supernatant was removed again by decantation and 20 ml of ethyl acetate was added to the precipitate, followed by stirring at room temperature for 30 minutes. The solution was filtered, washed with ethyl acetate and then vacuum drying to obtain 0.335 g of a pale yellow powdered solid. The yield on polymerization was 20%. 1H-NMR analysis revealed that the resulting solid is a comb-shaped polymer containing a xanthene-biphenylene copolymer type linear epoxy resin as a main chain and a poly(N-acetylethyleneimine) having a number average polymerization degree of 20 as a side chain.

Example 10

0.177 g (p-toluenesulfonyloxy group: 0.354 mmol) of the modified epoxy resin (1) obtained in Synthesis Example 1, 0.75 ml (0.752 g, 8.85 mmol) of 2-methyloxazoline, 0.89 ml (0.876 g, 8.85 mmol) of 2-ethyloxazoline and 5 ml of N,N-dimethylacetamide were stirred under a nitrogen atmosphere at 100° C. for 72 hours. To the resulting yellow semi-solid, 25 ml of ethyl acetate was added, followed by vigorous stirring at room temperature, filtration, washing with ethyl acetate and further vacuum drying to obtain 1.8 g of a white powdered solid. The yield on polymerization was 91%. 1H-NMR analysis revealed that the resulting solid is a comb-shaped polymer containing a bisphenol A type epoxy resin as a main chain and a polyethyleneimine random polymer chain having a number average polymerization degree of 69, comprising an acetylethyleneimine structural unit and a propionylethyleneimine structural unit, the number of moles of an acetyl group is the same as that of a propionyl group, as a side chain.

Example 11

0.147 g (p-toluenesulfonyloxy group: 0.354 mmol) of the modified epoxy resin (2) obtained in Synthesis Example 2, 0.75 ml (0.752 g, 8.85 mmol) of 2-methyloxazoline and 3.5 ml of N,N-dimethylacetamide were stirred under a nitrogen atmosphere at 100° C. for 36 hours. After the temperature of the reaction solution was decreased to 60° C., a mixture of 0.89 ml (0.876 g, 8.85 mmol) of 2-ethyloxazoline and 1.5 ml of N,N-dimethylacetamide was added under a nitrogen atmosphere, followed by stirring again at 100° C. for 36 hours, To the resulting yellow semi-solid, 25 ml of ethyl acetate was added, followed by vigorous stirring at room temperature, filtration, washing with ethyl acetate and further vacuum drying to obtain 1.82 g of a white powdered solid. The yield on polymerization was 92%. 1H-NMR analysis revealed that the resulting solid is a comb-shaped polymer containing a bisphenol A type epoxy resin as a main chain and a polyethyleneimine random polymer chain having a number average polymerization degree of 69, comprising a polymer block composed of an acetylethyleneimine structural unit and a polymer block composed of a propionylethyleneimine structural unit, the number of moles of an acetyl group is the same as that of a propionyl group, as a side chain.

Example 12

0.3 g of the comb-shaped epoxy resin obtained in Example 2 was stirred in 2.32 g of an aqueous 5 N hydrochloric acid at 90° C. for 8 hours. After cooling, about 10 ml of acetone was added to the solution containing a white precipitate produced with time. After standing, the supernatant was removed by decantation and the addition of acetone, standing and decantation were repeated again. After repeating the addition of acetone, standing and decantation 8 times, the white precipitate was filtered, washed with acetone and then vacuum dried at room temperature to obtain 0.257 g of a white powdered solid. 1H-NMR analysis revealed that the resulting solid is a comb-shaped epoxy resin containing a bisphenol A type epoxy resin as a main chain and a polyethyleneimine hydrochloride having a number average polymerization degree of 70 as a side chain. The yield on hydrolysis was 92%.

Example 13

0.15 g of the comb-shaped epoxy resin obtained in Example 3 was stirred in 1.16 g of an aqueous 5 N hydrochloric acid at 95° C. for 7 hours. After cooling, about 10 ml of acetone was added to the solution containing a white precipitate produced with time. After standing, the supernatant was removed by decantation and the addition of acetone, standing and decantation were repeated again. After repeating the addition of acetone, standing and decantation 8 times, the white precipitate was filtered, washed with acetone and then vacuum dried at room temperature to obtain 0.113 g of a white powdered solid. 1H-NMR analysis revealed that the resulting solid is a comb-shaped epoxy resin containing a bisphenol A type epoxy resin as a main chain and a polyethyleneimine hydrochloride having a number average polymerization degree of 25 as a side chain. The yield on hydrolysis was 91%.

Example 14

0.3 g of the comb-shaped epoxy resin obtained in Example 2 was stirred in 2.32 g of an aqueous 5 N hydrochloric acid at 85° C. for 2 hours. After cooling, about 15 ml of acetone was added to the solution containing a white precipitate produced with time. After standing, the supernatant was removed by decantation and the addition of acetone, standing and decantation were repeated again. After repeating the addition of acetone, standing and decantation 3 times, the white precipitate was filtered, washed with acetone and then vacuum dried at room temperature to obtain 0.173 g of a white powdered solid. 1H-NMR analysis revealed that the resulting solid is a comb-shaped epoxy resin containing a bisphenol A type epoxy resin as a main chain and a polyethyleneimine hydrochloride having a number average polymerization degree of 70, 30% of nitrogen atoms being substituted with an acetyl group, as a side chain. The yield on hydrolysis was 88%.

Example 15

5 ml of an aqueous solution containing 0.1 g of the comb-shaped epoxy resin obtained in Example 12 was charged in a cellulose permeable membrane, stirred in 500 ml of 5% ammonia water at room temperature for 8 hours and then allowed to stand for 4 days. The permeable membrane was washed with water and then stirred again in 500 ml of water at room temperature for one hour and a half. Subsequently, the permeable membrane was washed with water and then stirred again in 500 ml of fresh water at room temperature for one hour and a half. In the same manner, the permeable membrane was washed with water and stirred again in water, and then washed with acetone and stirred in 500 ml of acetone a room temperature for 2 hours. The semipermeable membrane was washed with acetone, stirred again in 500 ml of fresh acetone at room temperature for 4 hours and then allowed to stand overnight. The semipermeable membrane was dried at room temperature and opened to obtain 0.045 g of a white powder. 1H-NMR analysis revealed that the solid is a comb-shaped polymer containing a bisphenol A type epoxy resin as a main chain and polyethyleneimine having a number average polymerization degree of 70 as a side chain. The yield on desalination was 82%.

Example 16

0.354 g (p-toluenesulfonyloxy group: 0.708 mmol) of the modified epoxy resin (2) obtained in Synthesis Example 2, 3.0 ml (3.02 g, 35.4 mmol) of 2-methyloxazoline and 20 ml of N,N-dimethylacetamide were stirred under a nitrogen atmosphere at 100° C. for 24 hours. Subsequently, 2.78 g (1.42 mmol) of methoxypolyethylene glycol having a number average molecular weight of 2000 and 0.49 g (3.54 mmol) of potassium carbonate were added to the DMA reaction solution obtained by living cationic polymerization of 2-methyloxazoline, and then reaction was conducted at 100° C. for 48 hours. After the completion of the reaction, potassium carbonate was removed by filtration and the solution was reprecipitated and washed with an ethyl acetate/hexane mixed solution in a mixing weight ratio of 1:1. The solution was filtered and vacuum dried at 80° C. to obtain 4.2 g of a product.

Assignment of each peak was conducted by 1H-NMR spectrum thereby to confirm the structure of the product (1.6 ppm: methyl group of epoxy, 2.1 ppm: acetyl group of acylethyleneimine, 3.4 ppm: CH$_2$CH$_2$ of acylethyleneimine, 3.6 ppm: polyethylene glycol, 7.0 to 7.7 ppm: phenyl group of epoxy). Consequently, 1H-NMR analysis revealed that the resulting product is a comb-shaped epoxy resin containing a polymer chain composed of a poly N-acylethyleneimine-polyalkylene ether block unit introduced therein.

Example 17

In a 100 ml Kjeldahl flask, 2.0 g of a comb-shaped block copolymer comprising a poly N-acylethyleneimine-polyalkylene ether block unit synthesized in the same manner as in Example 16 was charged and 4.57 g (HCl: 22.8 mmol) of an aqueous 5N HCl solution was added. A magnetic stirrer was placed in the flask and then the flask was glass-stoppered. The block copolymer was dispersed by treating using an ultrasonic washer for one hour, followed by stirring at 90° C. for 10 hours.

After cooling, the reaction solution was added in 100 g of acetone while stirring. The resulting precipitate was filtered and then dissolved in 10 g of water. The solution was added again in 100 g of acetone while stirring and then the resulting precipitate was filtered. After vacuum drying at 80° C., the objective PEG-PEI-EPOP comb-shaped block copolymer was obtained. The yield was 92%.

Assignment of each peak was conducted by 1H-NMR spectrum thereby to confirm the structure of the product by disappearance of a peak at 2.1 ppm assigned to an acetyl group. Consequently, 1H-NMR analysis revealed that the resulting product is a comb-shaped epoxy resin containing a polymer chain composed of a polyethyleneimine-polyalkylene ether block unit introduced therein.

Application Example 1

10 ml of pure water was added to 3 mg of the comb-shaped epoxy resin obtained in Example 2 and, after dispersing by ultrasonic wave for one hour, the supernatant obtained by standing for at least 24 hours was dropped on a supporting film, followed by drying. The resulting thin film was observed by an electron microscope. Consequently, a circular (spherical) micelle having a diameter of about 10 nm was confirmed.

It was also confirmed by fluorescence spectrum measurement using pyrene as a probe that the critical micelle concentration of the comb-shaped epoxy resin obtained in Example 2 in water is 0.01 g/l or less.

Application Example 2

10 ml of pure water was added to 3 mg of the comb-shaped epoxy resin obtained in Example 12 and, after dispersing by ultrasonic wave for one hour, the supernatant obtained by standing for at least 24 hours was dropped on a supporting film, followed by drying. The resulting thin film was observed by an electron microscope. Consequently, a circular (spherical) micelle having a diameter of about 5 nm was confirmed.

It was also confirmed by fluorescence spectrum measurement using pyrene as a probe that the critical micelle concentration of the comb-shaped epoxy resin obtained in Example 12 in water is 0.005 g/l or less.

INDUSTRIAL APPLICABILITY

The comb-shaped epoxy resin of the present invention has a main chain of a hydrophobic moiety and a side chain of a hydrophilic moiety in the molecule, and also can control each structure. Such a polymer in the present invention can form a polymer association having a nano- to micron-scaled multi-hierarchical structure in an aqueous medium. Consequently, the polymer association thus obtained has a characteristic function which enables encapsulization, and can be applied for various purposes including medicines and pesticides, cosmetics, perfumes, toners, liquid crystals, inks, coating materials, devices and composite materials, and thus industrial meaning of the present invention is extremely great.

The invention claimed is:

1. A comb-shaped epoxy resin represented by the following formula (1):

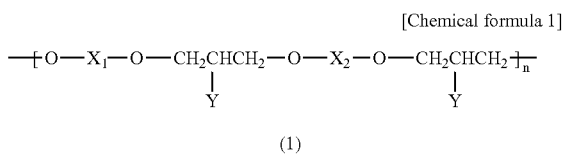

[Chemical formula 1]

(1)

in the formula (1), $X_1$ and $X_2$ may be the same or different and represents a divalent group having a residue selected from a xanthene residue which may have a methyl group or an ethyl group as a substituent, a biphenylene residue which may have a methyl group or an ethyl group as a substituent, a bisphenol residue which may have a methyl group or an ethyl group or a halogen atom as a substituent, a hydrogenated bisphenol residue which may have a methyl group as a substituent, an alkylene residue and a polyoxyalkylene residue, and at least one of them is an aromatic residue and may vary with a repeating unit; Y represents a linear polymer chain composed of at least one of an ethyleneimine structural unit and an N-acylethyleneimine unit, or a polymer chain composed of a polyethyleneimine-polyalkylene ether block unit or a poly N-acylethyleneimine-polyalkylene ether block unit, a number average polymerization degree being within a range from 5 to 2000, and n (number average polymerization degree) represents an integer of 3 to 200.

2. The comb-shaped epoxy resin according to claim 1, wherein $X_1$ and $X_2$ in the formula (1) are divalent groups selected from those represented by the following formula (2):

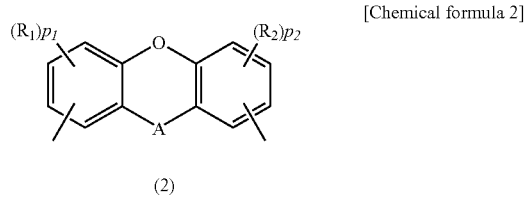

[Chemical formula 2]

(2)

the following formula (3):

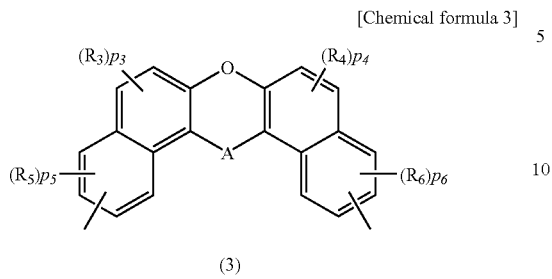

(3)

in the formula (2) and the formula (3), A represents a carbon atom, a methylene group, a methylene group substituted with an alkyl group having 1 to 4 carbon atoms, a methylene group substituted with a phenyl group, a methylene group substituted with a naphthyl group, a bimethylene group substituted with a phenyl group, a methylene group substituted with a 9-fluorenyl group, or a methylene group in which an alkyl group is further aromatic nucleus-substituted on the phenyl group, the naphthyl group or the biphenyl group, $R_1$ to $R_6$ represent a methyl group, $p_1$, $p_2$, $p_5$, $p_6$ each independently represents an integer of 0 to 3, and $p_3$ and $p_4$ each independently represents an integer of 0 to 2, the following formula (4):

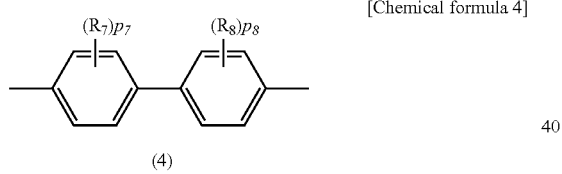

(4)

in the formula (4), $R_7$ and $R_8$ represent a methyl group, and $p_7$ and $p_8$ each independently represents an integer of 0 to 4, and the following formula (5):

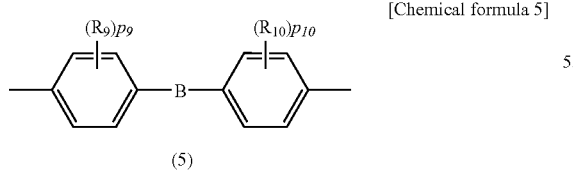

(5)

in the formula (5), B represents —C(CH$_3$)$_2$—, —CH(CH$_3$)—, —CH$_2$—, —C(CH$_3$)(CH$_2$CH$_3$)—, —C(CH$_3$)(C$_6$H$_5$)— or —SO$_2$—, $R_9$ and $R_{10}$ represent a methyl group or a halogen atom, and $p_9$ and $P_{10}$ each independently represents an integer of 0 to 4, and may vary with a repeating unit, and $X_2$ is a divalent group selected from those represented by the above formulas (2) to (5) and the following formula (6):

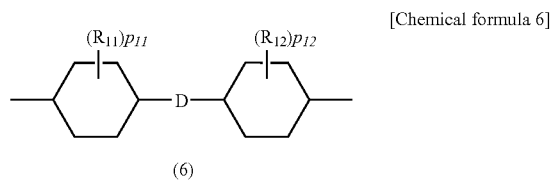

(6)

in the formula (6), D represents —C(CH$_3$)$_2$—, —CH(CH$_3$)—, —CH$_2$—, —C(CH$_3$)(CH$_2$CH$_3$)— or —C(CH$_3$)(C$_6$H$_5$), $R_{11}$ and $R_{12}$ represents a methyl group, and $p_{11}$ and $p_{12}$ each independently represents an integer of 0 to 4, the following formula (7):

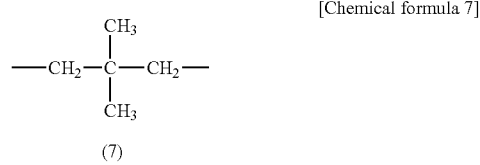

(7)

the following formula (8):

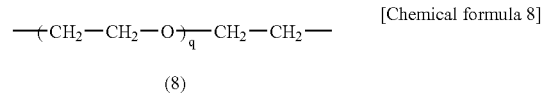

(8)

in the formula (8), q represents an integer of 0 to 100, and the following formula (9):

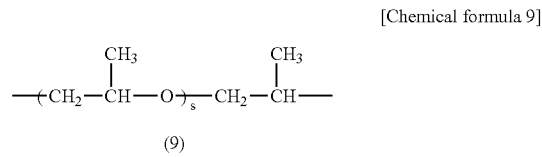

(9)

in the formula (9), s represents an integer of 0 to 100, and may vary with a repeating unit.

3. The comb-shaped epoxy resin according to claim 1 or 2, wherein the linear polymer chain composed of at least one of the ethyleneimine structural unit and the N-acylethyleneimine unit is represented by at least one selected from those represented by the following formula (10):

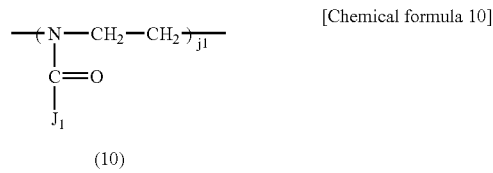

(10)

in the formula (10), $J_1$ represents a hydrogen atom, an alkyl group having 1 to 18 carbon atoms or an aryl group having 6 to 36 carbon atoms, and $j_1$ is within a range from 5 to 2,000, the following formula (11):

[Chemical formula 11]

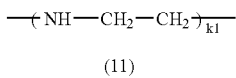

(11)

in the formula (11), $k_1$ is within a range from 5 to 2,000,
the following formula (12):

[Chemical formula 12]

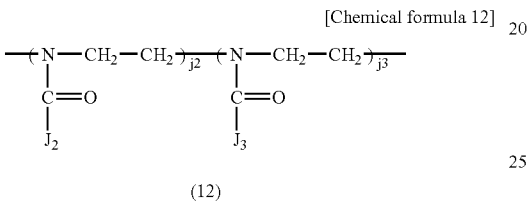

(12)

in the formula (12), $J_2$ and $J_3$ represent a hydrogen atom, an alkyl group having 1 to 18 carbon atoms or an aryl group having 6 to 36 carbon atoms, each being different, and $j_2+j_3$ is within a range from 5 to 2,000, the following formula (13):

[Chemical formula 13]

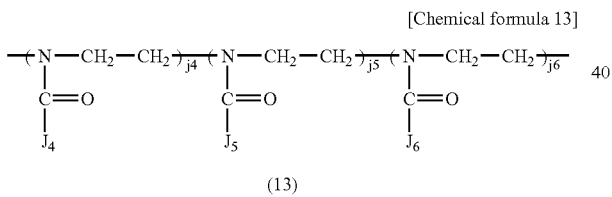

(13)

in the formula (13), $J_4$ to $J_6$ represent a hydrogen atom, an alkyl group having 1 to 18 carbon atoms or an aryl group having 6 to 36 carbon atoms, each being different, and $j_4+j_5+j_6$ is within a range from 5 to 2,000, the following formula (14):

[Chemical formula 14]

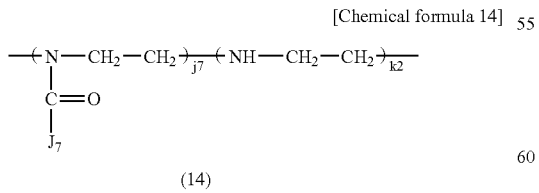

(14)

in the formula (14), $J_7$ represents a hydrogen atom, an alkyl group having 1 to 18 carbon atoms or an aryl group having 6 to 36 carbon atoms, and $j_7+k_2$ is within a range from 5 to 2,000, the following formula (15):

[Chemical formula 15]

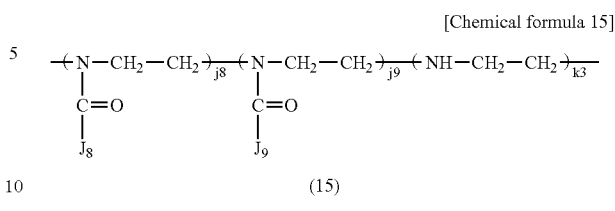

(15)

in the formula (15), $J_8$ and $J_9$ represent a hydrogen atom, an alkyl group having 1 to 18 carbon atoms or an aryl group having 6 to 36 carbon atoms, each being different, and $j_8+j_9+k_2$ is within a range from 5 to 2,000, the following formula (16):

[Chemical formula 16]

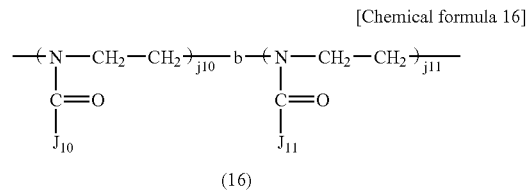

(16)

in the formula (16), $J_{10}$ and $J_{11}$ represent a hydrogen atom, an alkyl group having 1 to 18 carbon atoms or an aryl group having 6 to 36 carbon atoms, each being different, $j_{10}+j_{11}$ is within a range from 5 to 2,000, and b represents a block polymer composed of a block of each structural unit, and the following formula (17):

[Chemical formula 17]

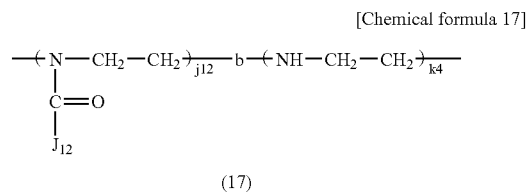

(17)

in the formula (17), $J_{12}$ represents an alkyl group having 1 to 18 carbon atoms or an aryl group having 6 to 36 carbon atoms, $j_{12}+k_4$ is within a range from 5 to 2,000, and b represents a block polymer composed of a block of each structural unit.

4. The comb-shaped epoxy resin according to claim 3, wherein $J_1$ to $J_{11}$ in the formulas (10) to (16) are groups selected from the group consisting of hydrogen atom, methyl group, ethyl group and phenyl group, and $J_{12}$ in the formula (17) is a group selected from the group consisting of methyl group, ethyl group and phenyl group.

5. The comb-shaped epoxy resin according to claim 1 or 2, wherein the polymer chain composed of the polyethylene-imine-polyalkylene ether block unit is represented by the following formula (18):

[Chemical formula 18]

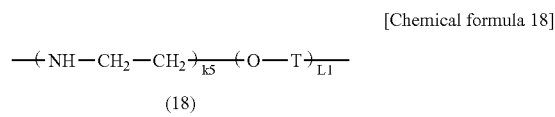

(18)

in the formula (18), k5 is within a range from 5 to 2,000, T is an alkylene group having 2 to 4 carbon atoms, and L1 is within a range from 5 to 2,000.

6. The comb-shaped epoxy resin according to claim 1 or 2, wherein the polymer chain composed of the poly N-acylethyleneimine-polyalkylene ether block unit is represented by the following formula (19)

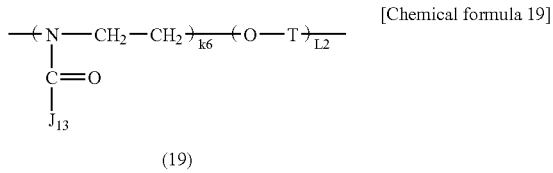

[Chemical formula 19]

(19)

in the formula (19), k6 is within a range from 5 to 2,000, $J_{13}$ is a group selected from the group consisting of hydrogen atom, methyl group, ethyl group and phenyl group, T is an alkylene group having 2 to 4 carbon atoms, and L2 is within a range from 5 to 2,000.

7. A method for preparing a comb-shaped epoxy resin comprising a main chain composed of an epoxy resin skeleton having an propylene unit, and a linear polymer chain obtained by polymerizing a cationic polymerizable monomer as a side chain, which comprises the steps of using, as a cation polymerization initiator, a modified epoxy resin wherein a hydroxy group of a side chain of a secondary alcohol structure moiety in an epoxy resin having a secondary alcohol structure is substituted with an alkylsulfonyloxy group or an arylsulfonyloxy group, and cation-polymerizing a monomer capable of being polymerized by cation polymerization from the side chain substituted with the alkylsulfonyloxy group or the arylsulfonyloxy group in the modified epoxy resin.

8. The method for preparing a comb-shaped epoxy resin according to claim 7, wherein the alkylsulfonyloxy group or the arylsulfonyloxy group is selected from the group consisting of methanesulfonyloxy group, trifluoromethanesulfonyloxy group, trichloromethanesulfonyloxy group, benzenesulfonyloxy group, p-toluenesulfonyloxy group, 2-nitrobenzenesulfonyloxy group and 2,4-dinitrobenzenesulfonyloxy group.

9. The method for preparing a comb-shaped epoxy resin according to claim 7 or 8, wherein the cationic polymerizable monomer is at least one selected from alkyleneimine monomer, oxazoline monomer, oxirane monomer, oxetane monomer, vinylether monomer and acetal monomer.

10. The method for preparing a comb-shaped epoxy resin according to claim 7 or 8, wherein the monomer capable of being polymerized by cationic polymerization is an oxazoline monomer.

11. A method for preparing a comb-shaped epoxy resin, comprising a polymer chain containing an ethyleneimine structural unit as a side chain, which comprises the step of hydrolyzing all or portion of N-acylethyleneimine structural units in the comb-shaped epoxy resin comprising a main chain composed of an epoxy resin skeleton having a propylene unit and a polymer chain composed of N-acylethyleneimine structural units obtained by cation polymerization of an oxazoline monomer obtained by the method of claim 10, thereby converting all or portion of the side chains into ethyleneimine structural units.

12. A method for preparing a comb-shaped epoxy resin, comprising a polymer chain composed of a poly N-acylethyleneimine-polyalkylene ether block unit in a side chain, which comprises the step of substituting an active terminal sulfonyloxy residue of the polymer chain in the comb-shaped epoxy resin comprising a main chain composed of an epoxy resin skeleton having a propylene unit and a polymer chain composed of N-acylethyleneimine structural units obtained by cation polymerization of an oxazoline monomer obtained by the method of claim 10 with polyalkylene glycol.

13. A method for preparing a comb-shaped epoxy resin, comprising a polyethyleneimine-polyalkylene ether block unit in a side chain, which comprises the steps of substituting an active terminal sulfonyloxy residue of the polymer chain in the comb-shaped epoxy resin having a main chain composed of an epoxy resin skeleton having a propylene unit and a polymer chain composed of N-acylethyleneimine structural units obtained by cation polymerization of an oxazoline monomer obtained by the method of claim 10 with polyalkylene glycol, and hydrolyzing the N-acylethyleneimine unit in the polymer chain.

* * * * *